United States Patent
Kasezawa

(10) Patent No.: US 8,059,959 B2
(45) Date of Patent: Nov. 15, 2011

(54) LOSS-OF-LIGHT DETECTING APPARATUS

(75) Inventor: Akihide Kasezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 823 days.

(21) Appl. No.: 12/036,450

(22) Filed: Feb. 25, 2008

(65) Prior Publication Data

US 2008/0232798 A1    Sep. 25, 2008

(30) Foreign Application Priority Data

Mar. 19, 2007    (JP) .................... 2007-070104

(51) Int. Cl.
*H04B 10/00* (2006.01)
*H04B 10/08* (2006.01)

(52) U.S. Cl. .......................... 398/33; 398/119
(58) Field of Classification Search .............. 398/33, 398/118–125, 128–131
See application file for complete search history.

(56) References Cited

U.S. PATENT DOCUMENTS

| 2004/0161234 A1 | 8/2004 | Ozawa | |
| 2006/0215545 A1* | 9/2006 | Nelson | 370/216 |
| 2007/0280684 A1* | 12/2007 | Onoda et al. | 398/38 |

FOREIGN PATENT DOCUMENTS

| JP | 11-317709 | 11/1999 |
| JP | 2004-247780 | 9/2004 |

* cited by examiner

*Primary Examiner* — Dalzid Singh
(74) *Attorney, Agent, or Firm* — Staas & Halsey LLP

(57) ABSTRACT

According to an aspect of an embodiment, an apparatus comprises: a correction level calculating unit that calculates a correction level, which is the input light level necessary to meet an optical signal-to-noise ratio at the maximum level of an optical noise signal; a loss-of-light detection threshold-value setting unit that compares the correction level with an initial threshold value to set a loss-of-light detection threshold value used in detection of any loss of light on the basis of the comparison result; and a loss-of-light detecting unit that compares the level of an input optical signal with the loss-of-light detection threshold value to determine that any loss of light is caused if the level of the input optical signal is lower than the loss-of-light detection threshold value.

8 Claims, 19 Drawing Sheets

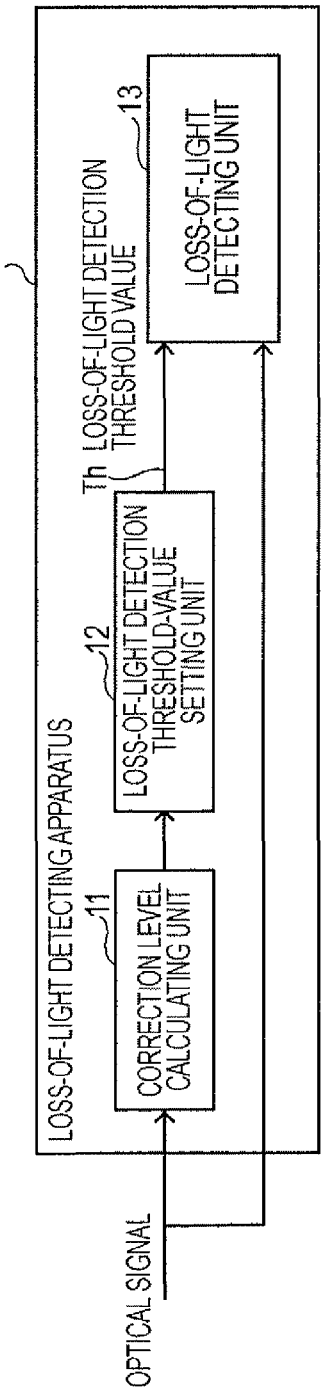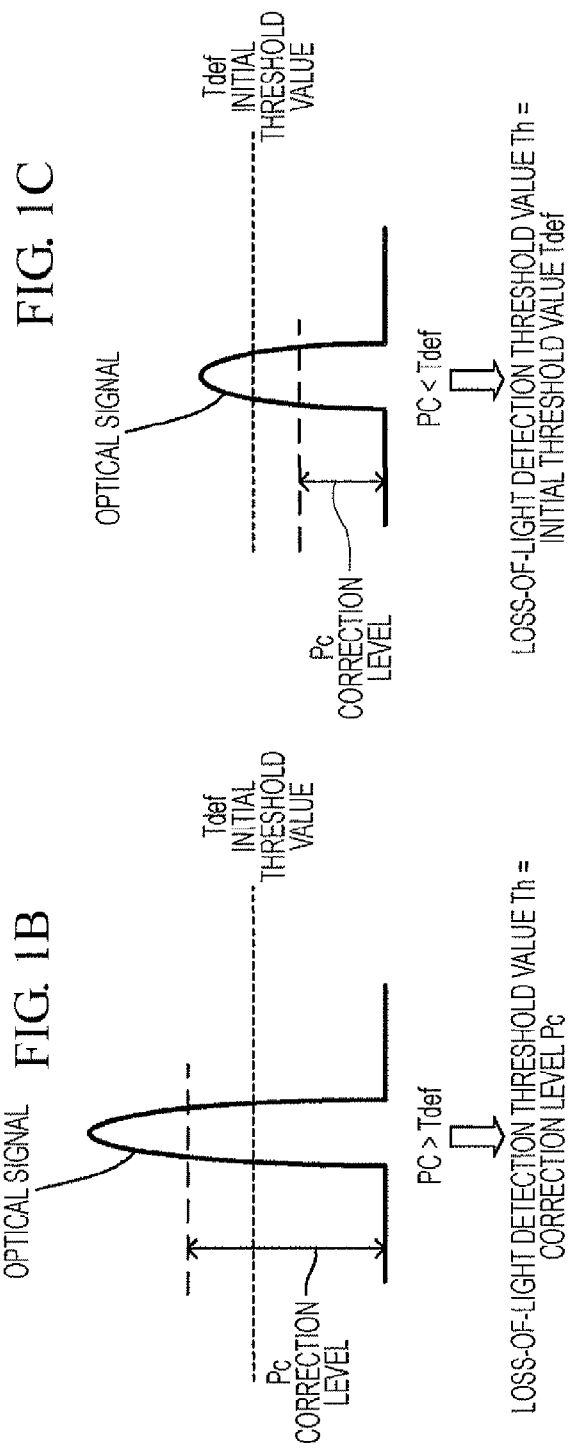

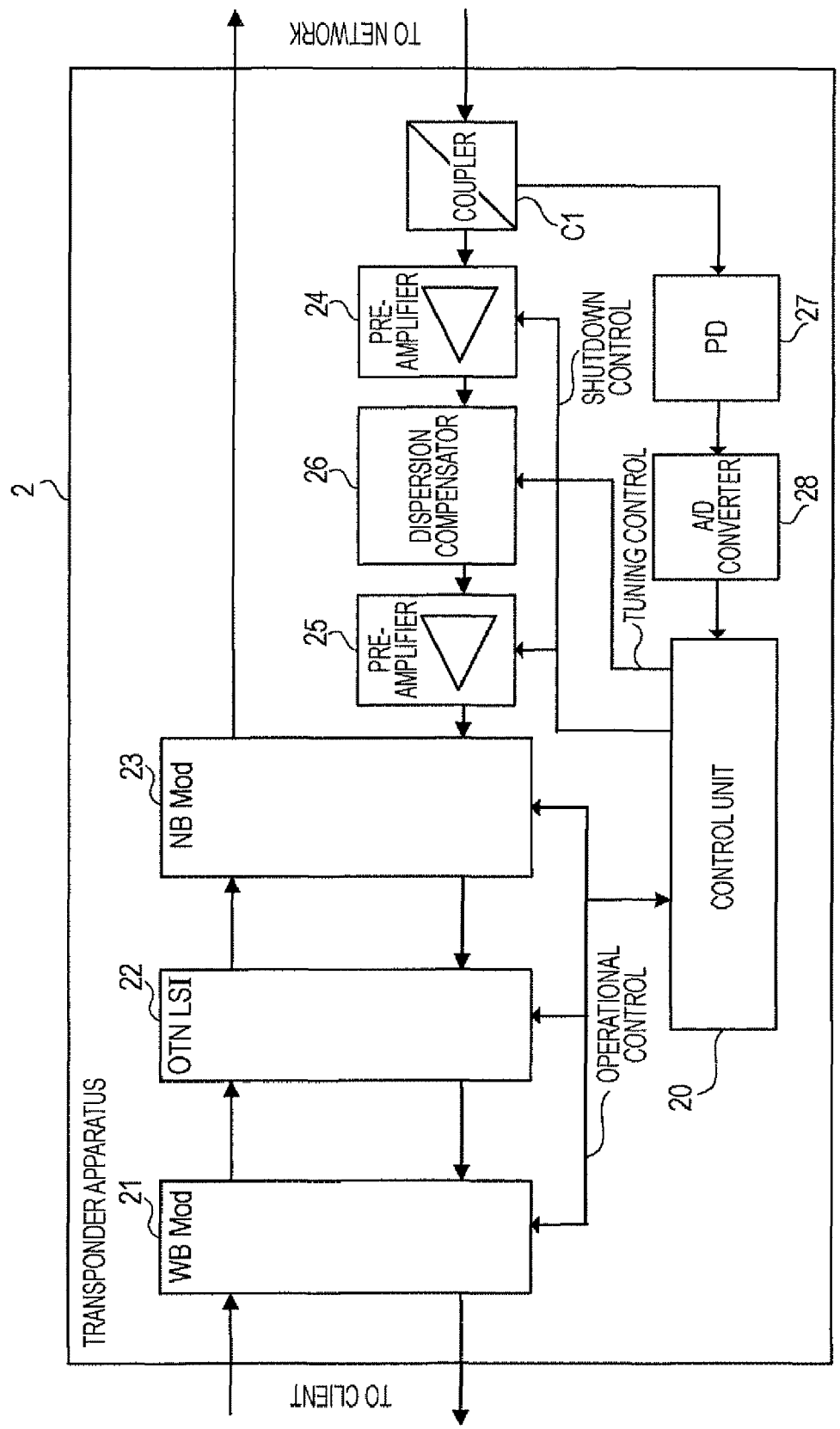

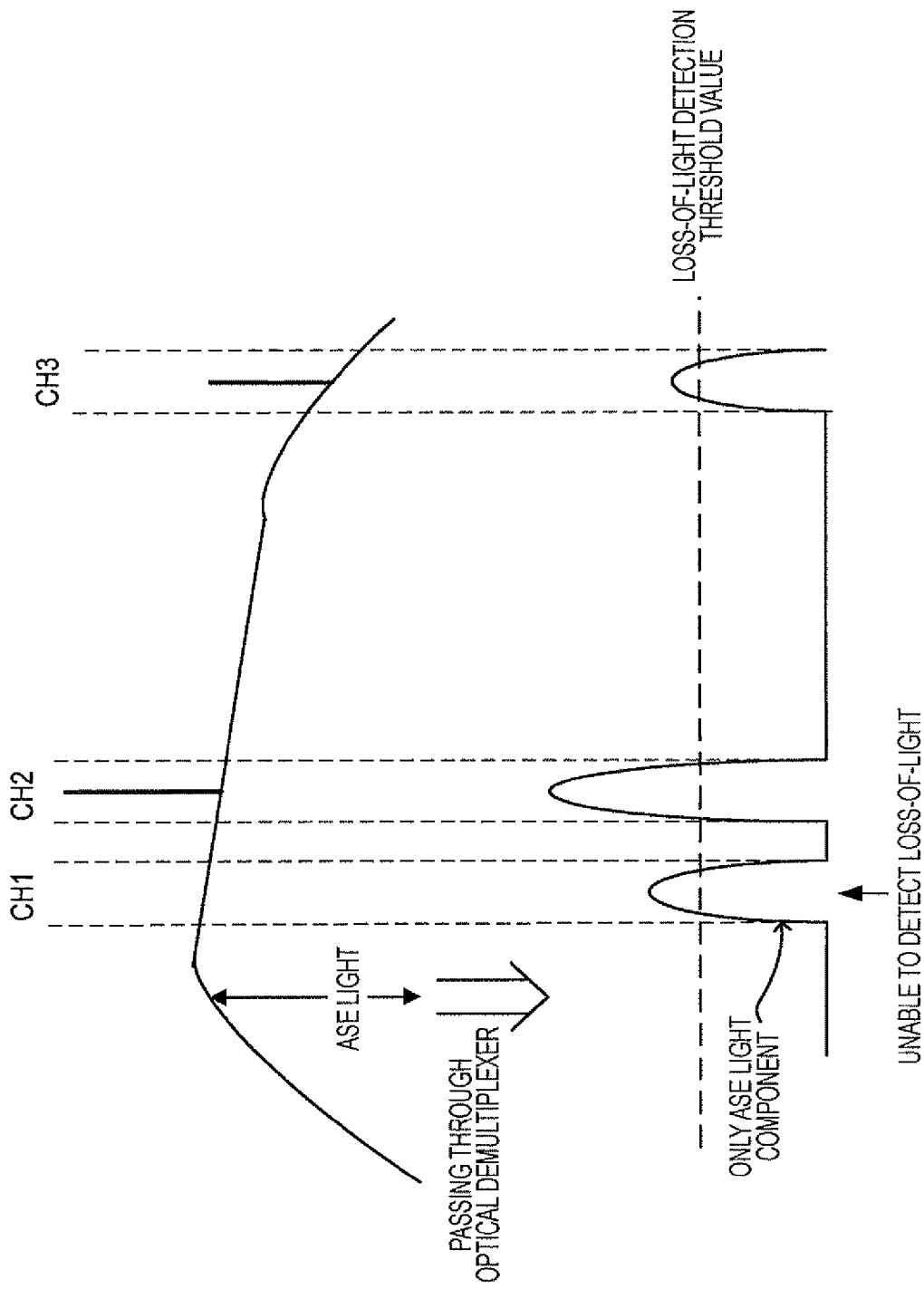

LOSS-OF-LIGHT DETECTING APPARATUS

BACKGROUND OF THE INVENTION

1. Field of the Invention

The present invention relates to loss-of-light detecting apparatuses and, more particularly, to a loss-of-light detecting apparatus detecting any loss of light.

2. Description of the Related Art

A basic architecture for optical transmission called Optical Transport Network (OTN) according to International Telecommunication Union Telecommunication Standardization sector (ITU-T) recommendations is used as an optical core network and development of the OTN has been advanced in recent years. In the OTN based on Wavelength Division Multiplexing (WDM) optical transmission, not only signals in telephone services but also signals in Internet Protocol (IP) or Ethernet® services can be processed.

FIG. 16 is a block diagram showing the configuration of a typical WDM apparatus. The WDM apparatus 50 includes a transponder unit 51 and a WDM unit 52 at the transmission side and includes a WDM unit 53 and a transponder unit 54 at the reception side.

The transponder unit 51 includes transponders 51-1 to 51-$n$ corresponding to n-number channels. The WDM unit 52 includes an optical multiplexer 52$a$ and a WDM post-amplifier 52$b$. The WDM unit 53 includes an optical demultiplexer 53$a$ and a WDM pre-amplifier 53$b$. The transponder unit 54 includes transponders 54-1 to 54-$n$ corresponding to n-number channels. Typically, arrayed waveguide gratings (AWGs) are used in the optical multiplexer 52$a$ and the optical demultiplexer 53$a$, and Erbium Doped Fiber Amplifiers (EDFAs) are used as the amplifiers.

The transponders 51-1 to 51-$n$ each receive an optical signal transmitted from a client and convert the optical signals into signals within a waveband appropriate for the WDM (wideband to narrowband conversion of the wavelengths). The optical multiplexer 52$a$ multiplexes the signals of the multiple wavelengths resulting from the wavelength conversion to generate a WDM signal. The WDM post-amplifier 52$b$ amplifies the WDM signal and supplies the amplified WDM signal to a network 5 through an optical fiber transmission path F.

The WDM pre-amplifier 53$b$ receives the WDM signal transmitted from the network 5 through the optical fiber transmission path F and amplifies the received WDM signal. The optical demultiplexer 53$a$ performs wavelength filtering to demultiplex the amplified WDM signal into an optical signal of each wavelength and outputs the optical signals. The transponders 54-1 to 54-$n$ each receive the optical signal of each wavelength, convert the received optical signals into the signals of the original wavelengths (narrowband to wideband conversion of the wavelengths), and transmit the signals to the client.

The transponders 54-1 to 54-$n$ each includes an optical amplifier and a dispersion compensator (not shown). The optical signal demultiplexed by the optical demultiplexer 53$a$ is amplified by the optical amplifier in each of the transponders 54-1 to 54-$n$. The dispersion compensator in each of the transponders 54-1 to 54-$n$ compensates for wavelength dispersion caused on the optical fiber transmission path F. The wavelength conversion is performed after the dispersion compensation.

In addition, the transponders 54-1 to 54-$n$ each detect any loss of light on the basis of the power of the input optical signal. If any loss of light is caused, the transponders 54-1 to 54-$n$ each perform shutdown control of the optical amplifier. For example, when the transponders 54-1 to 54-$n$ use variable dispersion compensators, the transponders 54-1 to 54-$n$ stop the dispersion compensation operation.

FIG. 17 illustrates an exemplary spectrum of optical signals. Referring to FIG. 17, the wavelength increases from left to right. An exemplary spectrum of an optical signal that passes through the optical fiber transmission path F and that is demultiplexed by the optical demultiplexer 53$a$ and is supplied to the transponder unit 54 is illustrated in FIG. 17. The level of the optical signal flowing through the optical fiber transmission path F is raised by amplified spontaneous emission (ASE) light. The ASE light typically has wavelength dependence. As shown in FIG. 17, the level of the ASE light is not constant in the waveform amplification area (1,560 to 1,630 nm in the lower band) of the EDFA and continuously decreases rightward, that is, continuously decreases toward the longer wavelengths.

Accordingly, even if the level of the optical signals transmitted from the transponders 51-1 to 51-$n$ is constant, the power of the ASE light in the optical signals amplified by the EDFAs on the transmission path is not constant for different wavelengths. Consequently, the power of the optical signals supplied to the transponders 54-1 to 54-$n$ through the optical demultiplexer 53$a$ is not constant for different wavelengths even if the power of the main signal component in the optical signal of each channel is constant.

FIG. 1B is a conceptual diagram of the reception capacity of a transponder. The reception capacity of a transponder is determined by the power of the input optical signal (the input light power) and the optical signal-to-noise ratio (OSNR). The OSNR is a ratio between the level of the optical signal and the level of the ASE light.

Since a channel CH2 has a sufficient input light power and the OSNR reference value of the channel CH2 is met (the level of the main signal component (data component) is higher than that of the ASE light component to an extent where the OSNR reference value is met), it is possible for the transponder to recognize data through the channel CH2. Since a channel CH1 has a sufficient input light power but the OSNR reference value of the channel CH1 is not met because the level of the ASE noise component is considerably higher than that of the main signal component, it is not possible for the transponder to recognize data through the channel CH1. Since a channel CH3 has an input light power lower than those of the channels CH2 and CH1 but the OSNR reference value of the channel CH3 is met, it is possible for the transponder to recognize data through the channel CH3.

The OSNR is determined by, for example, the frequency of the optical signal, the modulation method adopted in the apparatus, and the reception performance of the apparatus. When an Out of Band-Forward Error Correction (OOB-FEC) function is used to perform non return-to-zero modulation to a 10-Gbps optical signal, the OSNR is normally equal to about 15 dB. If the transmission bit rate is increased from 10 Gbps to 40 Gbps, the OSNR reference value is increased by about 6 dB.

The transponder can receive the optical signal if the input optical signal meets the conditions of the input light power and the OSNR, as described above. However, since it is determined whether the optical signal is received only on the basis of the input light power in the loss of light detecting function of transponders in related art, the transponders cannot detect any loss of light even if the loss of light is caused as in the channel CH1 and possibly erroneously recognize that the optical signal is normally received.

SUMMARY

According to an aspect of an embodiment, an apparatus comprises: a correction level calculating unit that calculates a correction level, which is the input light level necessary to meet an optical signal-to-noise ratio at the maximum level of an optical noise signal; a loss-of-light detection threshold-value setting unit that compares the correction level with an initial threshold value to set a loss-of-light detection threshold value used in detection of any loss of light on the basis of the comparison result; and a loss-of-light detecting unit that compares the level of an input optical signal with the loss-of-light detection threshold value to determine that any loss of light is caused if the level of the input optical signal is lower than the loss-of-light detection threshold value, wherein the loss-of-light detection threshold-value setting unit sets the correction level as the loss-of-light detection threshold value if the correction level is higher than the initial threshold value and sets the initial threshold value as the loss-of-light detection threshold value if the correction level is lower than the initial threshold value.

The above described aspect of an embodiment is an example. All embodiments are not limited to the features described in this example aspect of an embodiment.

BRIEF DESCRIPTION OF THE DRAWINGS

FIG. 1A illustrates a loss-of-light detecting apparatus;

FIG. 1B illustrates a diagram showing relationship among an optical signal level, a correction level and an initial threshold value;

FIG. 1C illustrates another diagram showing relationship among an optical signal level, a correction level and an initial threshold value;

FIG. 2 is a block diagram showing an example of the configuration of a transponder device;

FIG. 19 illustrates problems about the loss-of-light detection in a transponder in related art.

DETAILED DESCRIPTION OF THE EMBODIMENTS

Figure 3:
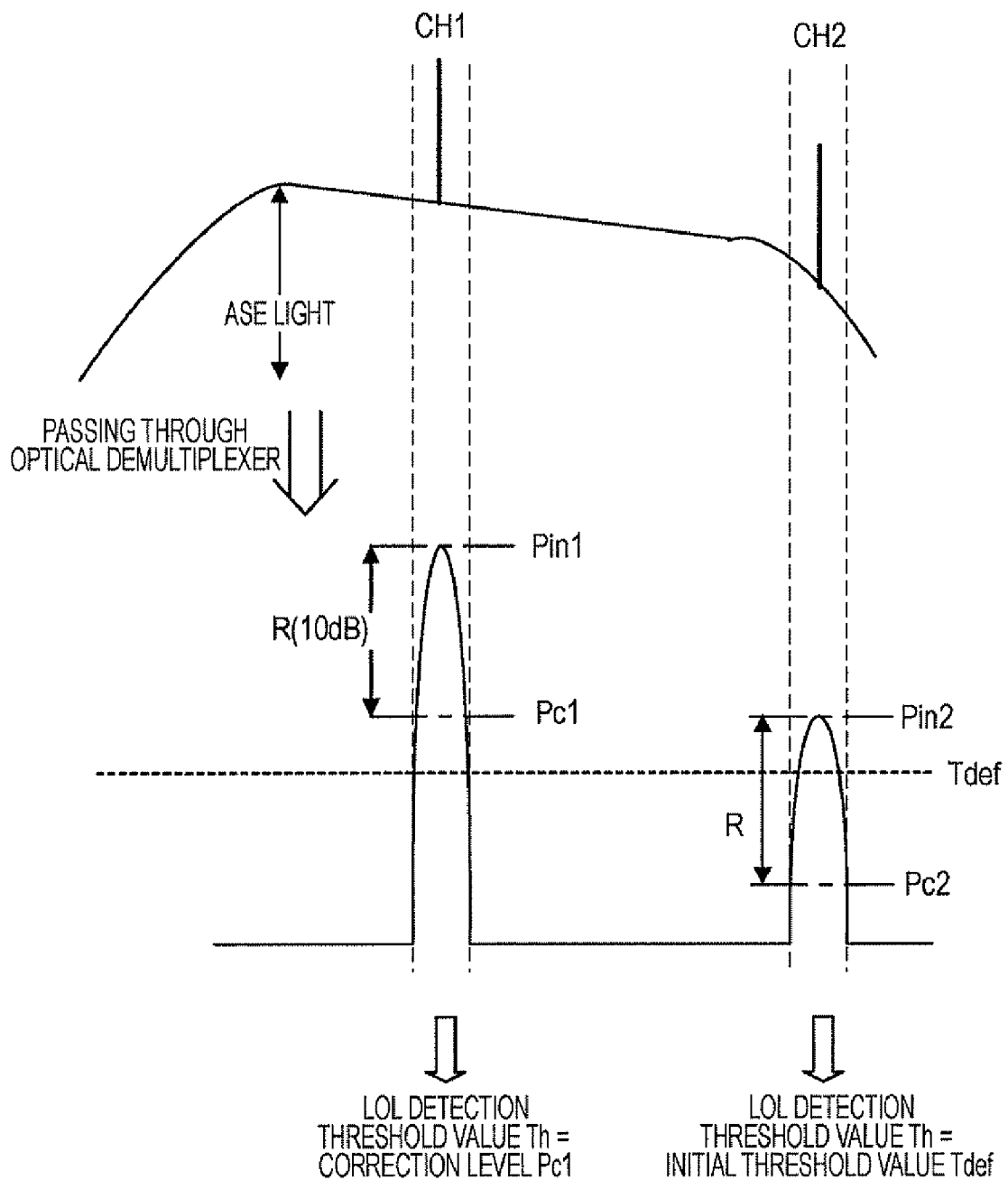
FIG. 3 illustrates an exemplary spectrum of optical signals for description of control of loss-of-light detection.

FIG. 19 illustrates problems about the loss-of-light detection in a transponder in the related art. A loss-of-light detection threshold value indicates the power level of the light when a signal that is supplied to the transponder and that meets the OSNR reference value becomes error free (bit error rate (BER)=1.0e-12 or lower).

No main signal component is supplied through a channel CH1 and only the ASE light is supplied to the transponder. If the input light power through the channel CH1 exceeds the loss-of-light detection threshold value in this state, the transponder erroneously recognizes that the main signal component is supplied through the channel CH1 despite the fact that no main signal component exists in the optical signal supplied through the channel CH1 because the determination is only based on the power level of the input light in the loss-of-light detecting function in the related art. Accordingly, there is a problem in that it is not possible for the transponder to detect any loss of light.

The same loss-of-light detection threshold value is set for all the channels in the control of the loss-of-light detection in the related art. Accordingly, if no main signal component exists in the optical signal supplied through a shorter-wavelength channel, just the level of the ASE light component through the channel can exceed the loss-of-light detection threshold value. As a result, the loss of light cannot be detected despite of the non-existence of the main signal component, causing a decrease in the detection accuracy of the loss of light.

When the loss of light cannot be reliably detected, it is not possible to control the shutdown of the optical amplifier and to control the adjustment of the dispersion compensation value in the dispersion compensator in an intended manner.

For example, when the shutdown of the optical amplifier cannot be controlled, the transient response of the EDFA caused by a rapid change in the level of light supplied to the transponder causes an intensive light to be incident on the dispersion compensator or other components, thereby possibly damaging the components. In other words, it is not possible to control the transponder so as to shut down the optical amplifier if any loss of light is caused, that is, if the level of the main signal component in the optical signal of each wavelength is lower than a predetermined value and so as to suppress the level of light output from the optical amplifier even if the loss of light is recovered to suddenly increase the level of the input light in order to prevent the intensive light from being incident on the components downstream of the optical amplifier.

In addition, some dispersion compensators are configured so as to mechanically vary the length of the waveguides in the dispersion compensators to adjust the amount of dispersion compensation. If any loss of light cannot be detected when such a dispersion compensator is used, the unnecessary mechanical operation is continued for a long time only with the ASE light being input, thereby rapidly deteriorating the movable portions in the dispersion compensator.

FIG. 1A illustrates a loss-of-light detecting apparatus according to a first embodiment. A loss-of-light detecting apparatus 10 according to the first embodiment includes a correction level calculating unit 11, a loss-of-light detection threshold-value setting unit 12, and a loss-of-light detecting unit 13.

The correction level calculating unit 11 calculates a correction level Pc, which is the input light level necessary to meet the optical signal-to-noise ratio (hereinafter referred to as OSNR) at the maximum level of an optical noise signal. Specifically, the correction level calculating unit 11 subtracts a preset value from the input light level of the optical signal (the main signal component+the noise component) to generate the correction level Pc. A method of calculating the correction level Pc will be described in detail below.

The loss-of-light detection threshold-value setting unit 12 compares the correction level Pc with an initial threshold value Tdef that is set in advance to set a loss-of-light detection threshold value Th used in the detection of any loss of light.

Specifically, if the correction level Pc is higher than the initial threshold value Tdef as in FIG. 1B, the loss-of-light detection threshold-value setting unit 12 sets the correction level Pc as the loss-of-light detection threshold value Th. If the correction level Pc is lower than the initial threshold value Tdef as in FIG. 1C, the loss-of-light detection threshold-value setting unit 12 sets the initial threshold value Tdef as the loss-of-light detection threshold value Th.

The loss-of-light detecting unit 13 compares the input light level of the optical signal with the loss-of-light detection threshold value Th set in the loss-of-light detection threshold-value setting unit 12. If the input light level is lower than the loss-of-light detection threshold value Th, the loss-of-light detecting unit 13 determines that loss of light is caused and raises an alarm or performs other control processing.

The configuration of the transponder to which the loss-of-light detecting apparatus 10 according to the first embodiment is applied will now be described. The loss of light is hereinafter sometimes referred to as "LOL".

FIG. 2 is a block diagram showing an example of the configuration of a transponder device 2. The transponder device 2 is, for example, an optical transmission apparatus conforming to the OTN standard based on the WDM optical transmission. The transponder device 2 can be used as the transponders 51-1 to 51-$n$ and the transponders 54-1 to 54-$n$ described above with reference to FIG. 16.

The transponder device 2 includes a wideband module (WB Mod: wideband optical interface module) 21, a OTN large scale integration (LSI) 22, a narrowband module (NB Mod: narrowband optical interface module) 23, a coupler C1, pre-amplifiers 24 and 25, a dispersion compensator 26, a photodetector (PD) 27, an analog-to-digital (A/D) converter 28, and a control unit 20.

The WB Mod 21 performs optical-to-electrical (O/E) conversion to an optical signal supplied from a client. The OTN LSI 22 converts the signal resulting from the O/E conversion into an OTN format by using a digital wrapper function in which data is wrapped with an OTN header and forward error correction (FEC). The NB Mod 23 performs electrical-to-optical (E/O) conversion to the signal supplied from the OTN LSI 22 to convert the wavelength of the signal into a narrowband for the WDM and supplies the signal of the narrowband to a network. The optical signal output from the NB Mod 23 is multiplexed with an optical signal processed by another transponder by the optical multiplexer 52$a$ shown in FIG. 16 and is supplied to the network.

Figure 16:
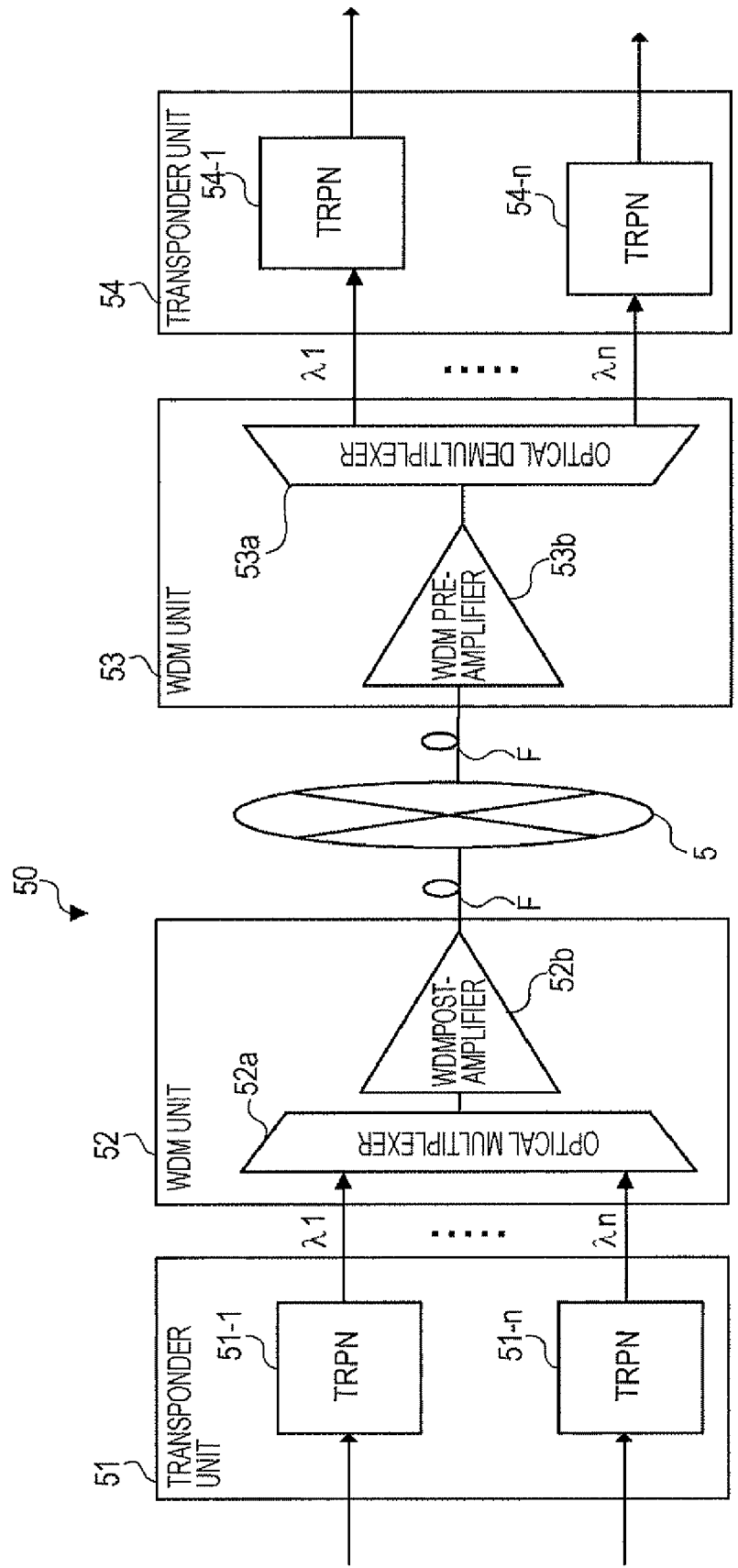
FIG. 16 is a block diagram showing the configuration of a typical WDM apparatus.
Figure 17:
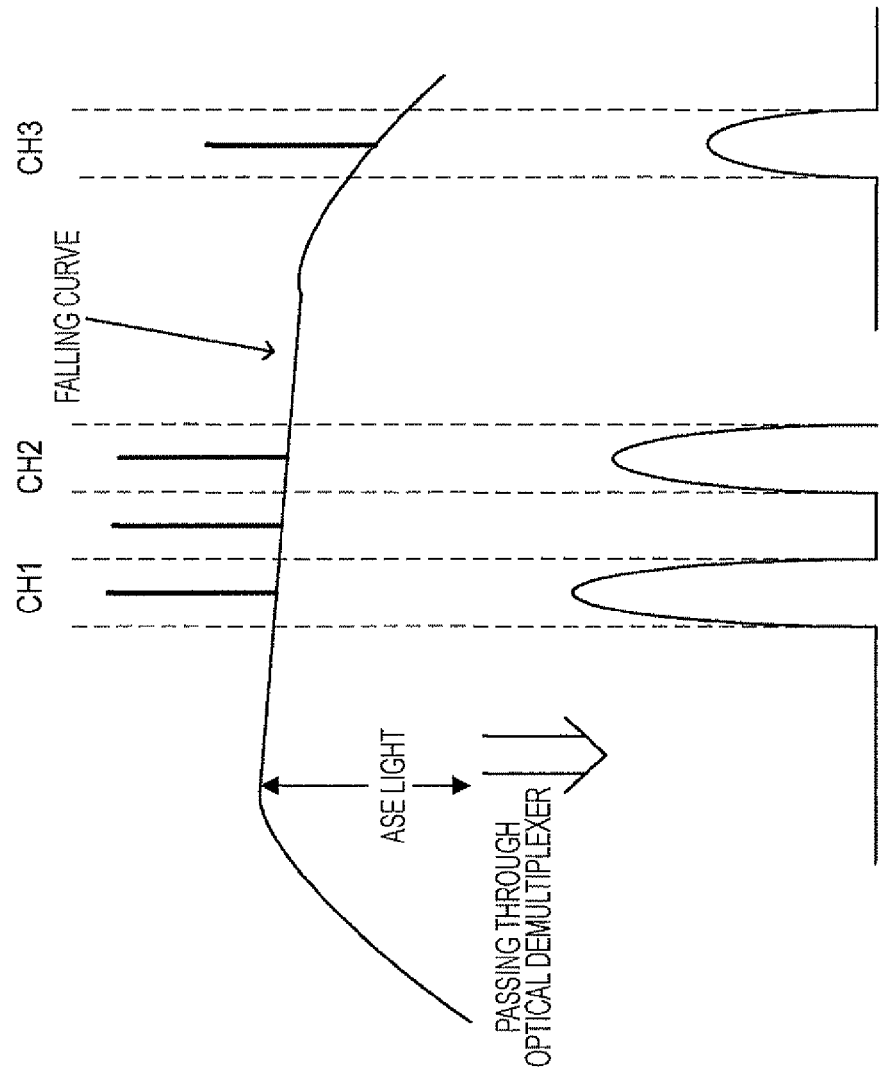
FIG. 17 illustrates an exemplary spectrum of optical signals.
Figure 18:
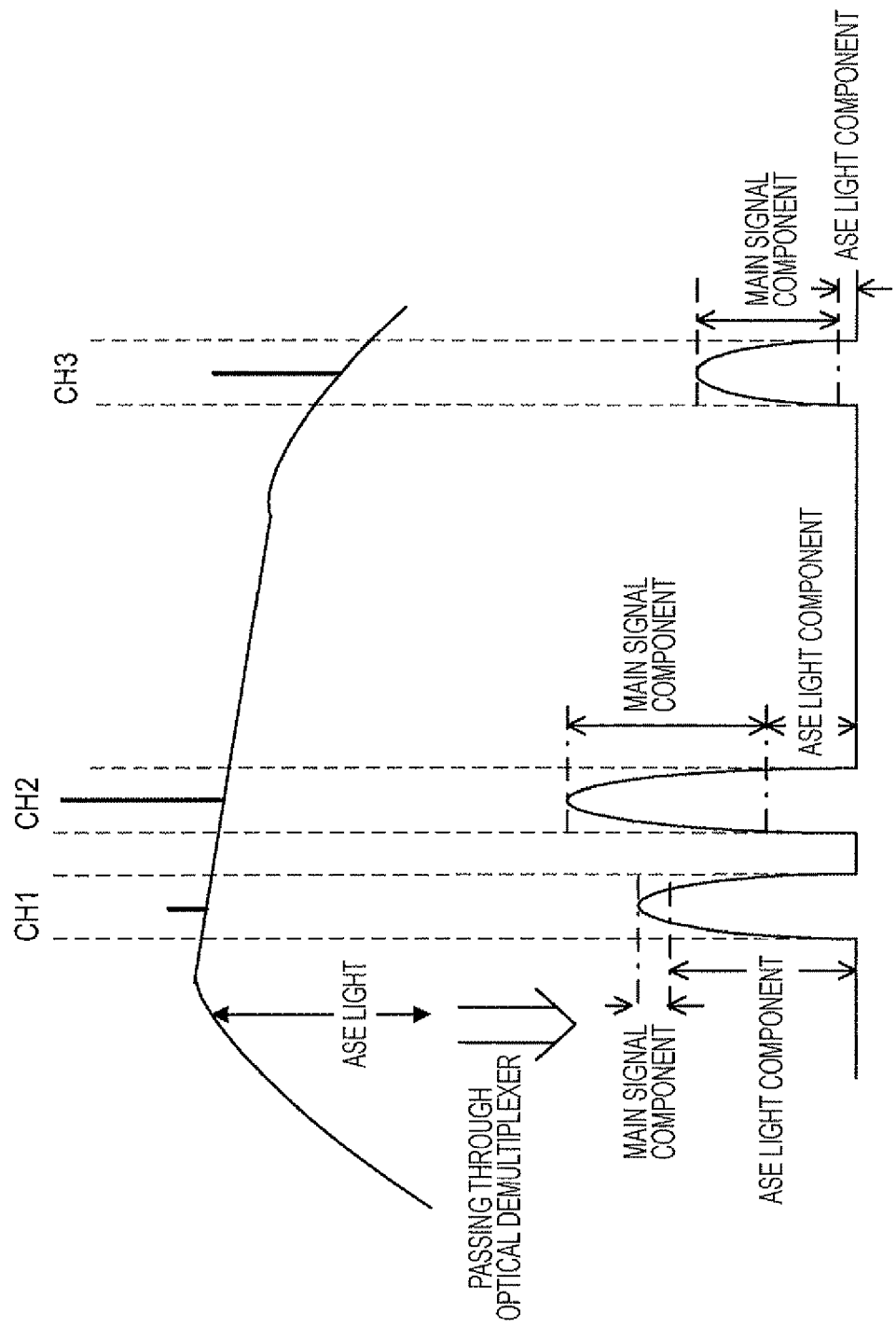
FIG. 18 is a conceptual diagram of the reception capacity of a transponder.

The coupler C1 splits an input optical signal that is supplied from the network and that is demultiplexed by the optical demultiplexer 53$a$ shown in FIG. 16 into two signal components. The coupler C1 supplies one of the signal components to the pre-amplifier 24 for reception of the main signal and supplies the other of the signal components to the photodetector 27 for detection of any loss of light.

The pre-amplifier 24 amplifies the input optical signal. The dispersion compensator 26 compensates for any dispersion caused on the transmission path. The pre-amplifier 25 amplifies the optical signal subjected to the dispersion compensation. The NB Mod 23 performs the O/E conversion to the amplified optical signal. The OTN LSI 22 terminates the digital wrapping of the electrical signal subjected to the O/E conversion. The WB Mod 21 performs the E/O conversion to the optical signal after the termination of the digital wrapping to convert the wavelength of the optical signal into a wideband and supplies the signal of the wideband to the client.

The photodetector 27 converts the input light power (input light level) of the optical signal for monitoring, split by the coupler C1, into an analog signal. The A/D converter 28 converts the analog signal indicating the input light power into a digital signal and supplies the digital signal to the control unit 20. The control unit 20 has the functions of the correction level calculating unit 11, the loss-of-light detection threshold-value setting unit 12, and the loss-of-light detecting unit 13 shown in FIG. 1. The control unit 20 stores the input light power subjected to the analog-to-digital conversion in an internal register as a value used for monitoring the performance. The control unit 20 controls detection of any loss of light with system software.

The control unit 20 performs operational control, such as data setup, of the WB Mod 21, the OTN LSI 22, and the NB Mod 23. The control unit 20 shuts down the pre-amplifiers 24 and 25 if any loss of light is detected so as to stop the output of the excitation light (or pumping light) from the EDFAs and clears the shutdown of the pre-amplifiers 24 and 25 if the loss of light is recovered so as to output the excitation light. The control unit 20 stops adjustment of the dispersion compensation in the dispersion compensator 26 if any loss of light is detected and starts the adjustment of the dispersion compensation in the dispersion compensator 26 if the loss of light is recovered.

Control of the loss-of-light detection in the transponder device 2 according to the first embodiment will now be described in detail.

FIG. 3 illustrates an exemplary spectrum of optical signals for description of the control of the loss-of-light detection. Referring to FIG. 3, the horizontal axis represents wavelength. The wavelength increases from left to right.

A larger amount of ASE light is caused on a channel CH1 through which the optical signal is supplied from the network, compared with a channel CH2, when the optical signal passes through the amplifiers in the network. The input light power through the channel CH1 is denoted by "Pin1" and the input light power through the channel CH2 is denoted by "Pin2" in FIG. 3.

The control unit 20 subtracts a preset value R (for example, 10 dB) from the Pin1, which denotes the input light power of the channel CH1, to calculate a correction level Pc1 necessary to meet the OSNR when the maximum ASE light is caused. Then, the control unit 20 compares the correction level Pc1 with the initial threshold value Tdef.

On the channel CH1, the correction level Pc1 is higher than the initial threshold value Tdef (Pc1>Tdef). If the correction level is higher than the initial threshold value as in this case, the control unit 20 uses the correction level Pc1 as the loss-of-light detection threshold value Th. Specifically, the control unit 20 uses the correction level Pc1 as the threshold value in the loss-of-light detection on the channel CH1.

Similarly, the control unit 20 subtracts the preset value R from the Pin2, which denotes the input light power of the channel CH2, to calculate a correction level Pc2. Then, the control unit 20 compares the correction level Pc2 with the initial threshold value Tdef.

On the channel CH2, the initial threshold value Tdef is higher than the correction level Pc2 (Pc2<Tdef). If the initial threshold value is higher than the correction level as in this case, the control unit 20 uses the initial threshold value Tdef as the loss-of-light detection threshold value Th. Specifically, the control unit 20 uses the initial threshold value Tdef as the threshold value in the loss-of-light detection on the channel CH2.

The method of calculating the correction level Pc will now be described. According to the first embodiment, the preset value R is set to 10 dB and the level 10 dB lower than the input light power of the optical signal is set as the correction level Pc. The reasons why the preset value R is set to 10 dB will now be described.

The OSNR reference value is defined by Equation (1):

$$OSNR[dB] = 10 \times \log 10 (P_{sig}/P_{ASE}) \tag{1}$$

where "$P_{sig}$" denotes the power of main signal component [mW] and "$P_{ASE}$" denotes the power of the ASE light [mW].

Figure 4:
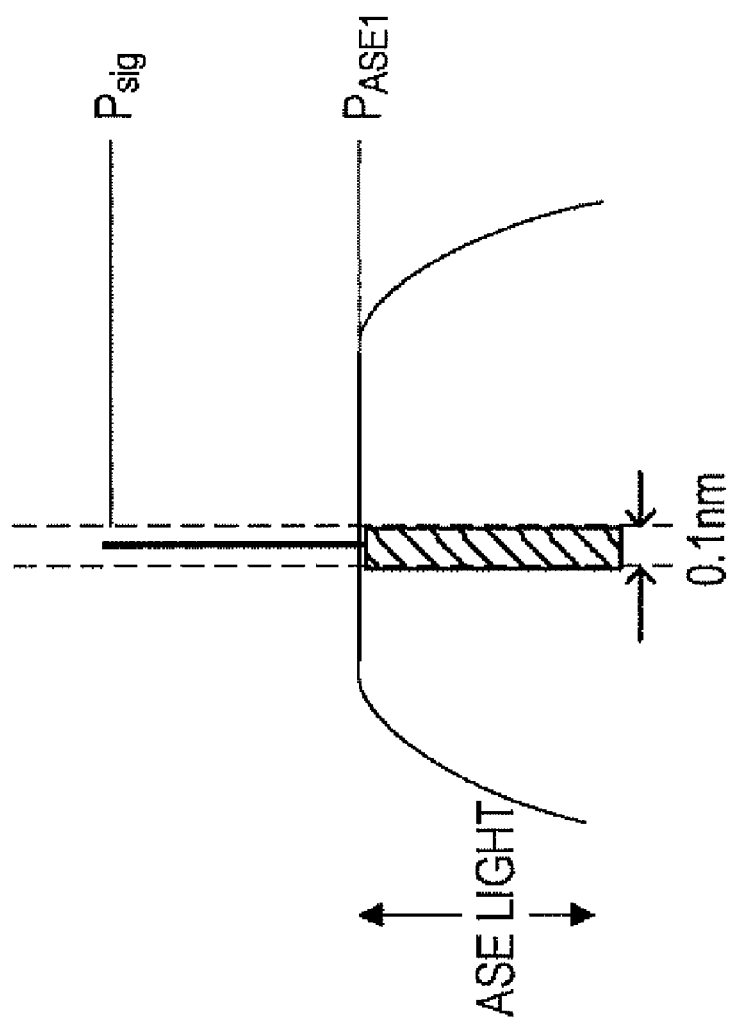
FIG. 4 shows a spectrum including an ASE light and a main signal component.
Figure 5:
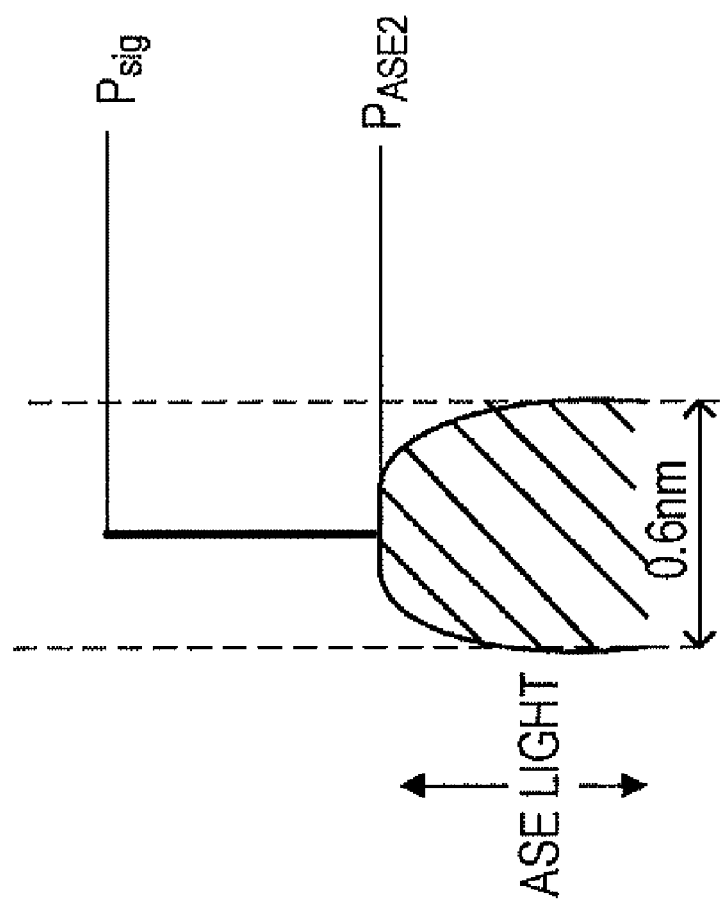
FIG. 5 shows another spectrum including an ASE light and a main signal component.

FIGS. 4 and 5 illustrate exemplary spectra of optical signals each including ASE light and the main signal component.

FIG. 4 shows the power of the main signal component and the power of the ASE light of an optical signal within a 0.1-nm bandwidth based on the defined OSNR reference value. FIG. 5 shows the power of the main signal component and the power of the ASE light of an optical signal within a 0.6-nm bandwidth input in the transponder device 2. The bandwidth of the ASE light input in the transponder device 2 is determined by the characteristics of the optical demultiplexer (for example, the AWG). According to the first embodiment, it is assumed that the bandwidth of the ASE light is equal to 0.6 nm.

Typically, the ratio between the power of the main signal component and that of the ASE light based on the OSNR reference value is not equal to the ratio between the power of the main signal component and that of the ASE light of an optical signal input in the transponder device 2.

A power $P_{ASE1}$ (mW) of the ASE light within the 0.1-nm bandwidth is converted into the power (dBm) thereof according to Equation (2):

$$ASE1[dBm] = 10 \times \log 10(P_{ASE1}[mV]) \tag{2}$$

A power $P_{ASE2}$ (mW) of the ASE light within the 0.6-nm bandwidth is converted into the power (dBm) thereof according to Equation (3):

$$ASE2[dBm] = 10 \times \log 10(P_{ASE2}[mV] \tag{3}$$

The ratio between the power of the ASE light within the 0.1-nm bandwidth and the power of the ASE light within the 0.6-nm bandwidth is represented by Equation (4) because the ratio therebetween is equal to the area ratio between the shaded area in FIG. 4 and the shaded area in FIG. 5:

$$P_{ASE2} = (0.6/0.1) \times P_{ASE1} \tag{4}$$

The logarithm of both sides of Equation (4) is represented by Equation (5):

$$10 \times \log 10 P_{ASE2} = 10 \times \log 10 ((0.6/0.1) \times P_{ASE1}) \tag{5}$$
$$= 10 \times \log 10 (0.6/0/1) + 10 \times \log 10 P_{ASE1}$$

Equation (5) is converted into Equation (6) by using Equations (2) and (3):

$$ASE2 = 10 \times \log 10(0.6/0.1) + ASE1 \tag{6}$$

Substitution of ΔASE for 10×log 10 (0.6/0.1) results in Equation (7):

$$ASE1 = ASE2 - \Delta ASE \tag{7}$$

In contrast, Equation (1) of the OSNR reference value is converted into Equation (8) by using Equation (7):

$$OSNR = 10 \times \log 10 (P_{sig}/P_{ASE1}) \tag{8}$$
$$= 10 \times \log 10 P_{sig} - 10 \times \log 10 P_{ASE1}$$
$$= S - ASE1$$
$$= S - ASE2 + \Delta ASE$$

where "S" is substituted for "10×log $10P_{sig}$".

The power (ASE2) of the ASE light input in the transponder device 2 had a worst value of −10.6 dBm according to the result of an actual measurement in the system. The OSNR reference value is higher than 20.6 dB. In addition, ΔASE=10×log 10(0.6/0.1)=7.8 dB. Substitution of these values in Equation (8) results in:

$$OSNR = S - ASE2 + \Delta ASE > 20.6 \tag{9a}$$

$$S > 20.6 + ASE2 - \Delta ASE = 20.6 + (-10.6) - 7.8 \tag{9b}$$
$$= 2.2$$

According to Equation (9b), the minimum power level of the optical signal meeting the OSNR reference value is equal to +2.2 dBm. Accordingly, the minimum value of the difference in the level between the power of the main signal component and the power of the ASE light in the optical signal meeting the OSNR reference value is equal to 12.8 dB (+2.2−(−10.6)).

However, since the loss in the connectors is not considered in the above calculations, the power of an optical signal that is actually input is reduced by an amount corresponding to the loss in the connectors. Accordingly, according to the first embodiment, the preset value R is set to 10 dB, instead of 12.8 dB, and the level that is 10 dB lower than that of the input optical signal is set as the correction level Pc.

As described above, according to the first embodiment, the loss-of-light detection threshold value Th is determined on the basis of the input optical signal of each wavelength channel, so that it is possible to reliably detect loss of light through a wavelength channel that does not include the main signal component and that includes only the ASE light component. In addition, it is possible to shut down the pre-amplifiers 24 and 25 and to adjust the dispersion compensation value in the dispersion compensator 26 without error at the detection of any loss of light.

A loss-of-light detecting apparatus according to a second embodiment will now be described. It is assumed in the first embodiment that the main signal component is input in the system initially (at system startup) and, for example, the parameter $P_{sig}$ of the main signal component is used to calculate the loss-of-light detection threshold value. However, the main signal component is not necessarily input in the system at system startup and the loss-of-light detection threshold value cannot be correctly calculated if the optical signal including only the ASE light is initially input in the system. Accordingly, according to the second embodiment, how the loss-of-light detection threshold value is set and controlled when the main signal component is not input in the system at system startup is described.

Figure 6A:
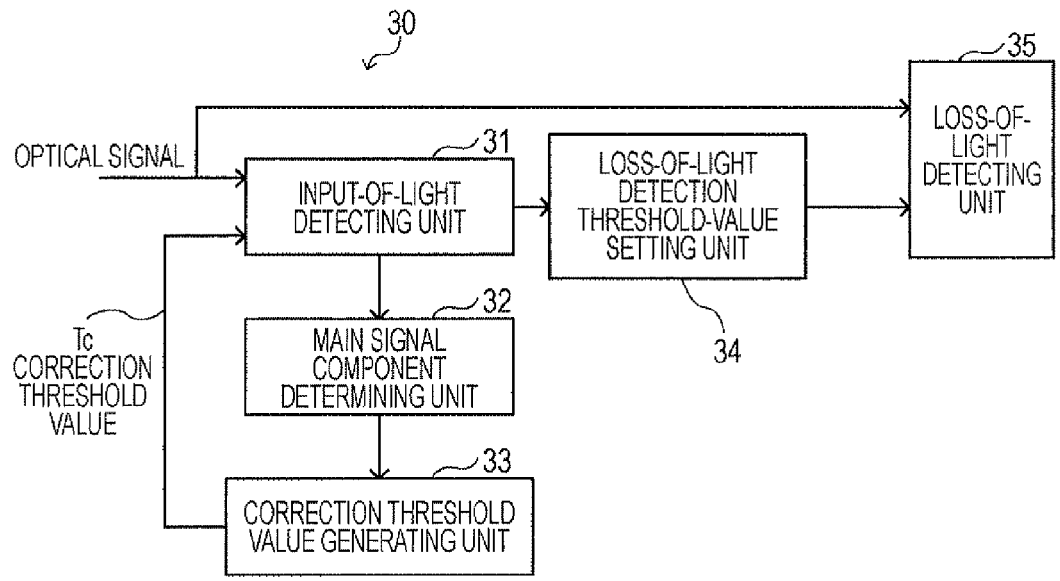
FIG. 6A illustrates a loss-of-light detecting apparatus.

FIG. 6A illustrates a loss-of-light detecting apparatus according to the second embodiment. A loss-of-light detecting apparatus 30 according to the second embodiment includes an input-of-light detecting unit 31, a main signal component determining unit 32, a correction threshold value generating unit 33, a loss-of-light detection threshold-value setting unit 34, and a loss-of-light detecting unit 35.

The input-of-light detecting unit 31 detects input of an optical signal. The input-of-light detecting unit 31 uses an initial input-of-light detection threshold value T0 in the first detection of input of an optical signal and uses a correction threshold value Tc generated by the correction threshold value generating unit 33 in the second and subsequent detections of input of an optical signal through the same wavelength channel.

The main signal component determining unit 32 determines whether the main signal component is included in the input optical signal. The correction threshold value generating unit 33 adds a predetermined value α to the initial input-of-light detection threshold value T0 used in the first detection of input of an optical signal in the input-of-light detecting unit 31 to generate the correction threshold value Tc, thereby increasing the threshold value, if the optical signal does not include the main signal component and includes only the ASE light.

The loss-of-light detection threshold-value setting unit 34 sets a loss-of-light detection threshold value Th used for detecting any loss of light on the basis of the level of the ASE light and the correction threshold value Tc. The loss-of-light detecting unit 35 compares the level of the input optical signal and the loss-of-light detection threshold value Th and determines that loss of light is caused if the level of the input optical signal is lower than the loss-of-light detection threshold value Th.

The correction threshold value generating unit 33 repeats the process of increasing the threshold value until the level of the optical signal including only the ASE light becomes lower than the correction threshold value Tc. The loss-of-light detection threshold-value setting unit 34 sets the correction threshold value Tc higher than the level of the ASE light as the loss-of-light detection threshold value Th.

Figure 6B:
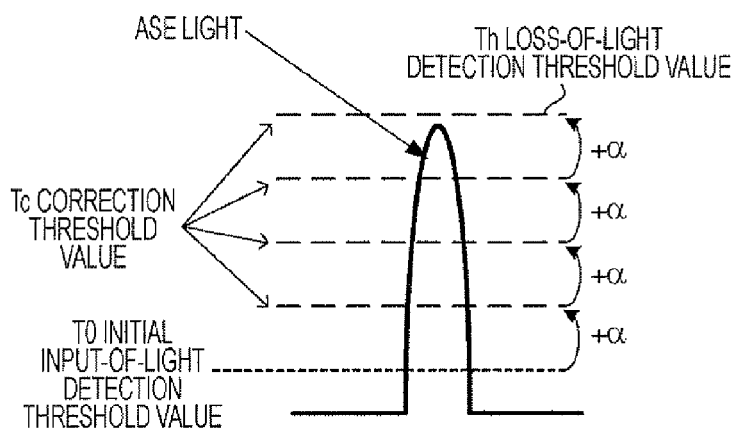
FIG. 6B illustrates a diagram showing relationship among an ASE light level, a loss-of-light detection threshold value, correction threshold values and an initial input-of-light detection threshold value.

For example, in the diagram shown in FIG. 6B, only the ASE light is input through a certain wavelength channel. The initial input-of-light detection threshold value T0 is increased each time input of the ASE light is detected. When the correction threshold value Tc exceeds the level of the ASE light at the fourth detection of input of the optical signal, the fourth correction threshold value Tc is set as the loss-of-light detection threshold value Th.

The operation of a transponder to which the loss-of-light detecting apparatus 30 according to the second embodiment is applied will now be described. The configuration of the transponder is the same as that of the transponder device 2 shown in FIG. 2. The functions of the input-of-light detecting unit 31, the correction threshold value generating unit 33, the loss-of-light detection threshold-value setting unit 34, and the loss-of-light detecting unit 35 in FIG. 6A are included in the control unit 20 shown in FIG. 2, and the function of the main signal component determining unit 32 in FIG. 6A is included in the NB Mod 23 shown in FIG. 2.

The transponder device 2 uses an R_IN_ALM signal of the NB Mod 23 only at the initial setup. The R_IN_ALM signal is output from a clock and data recovery (CDR) circuit in the NB Mod 23. The R_IN_ALM signal is set to "L" when a data component (main signal component) is detected from an input optical signal and is set to "H" when the input optical signal includes only the ASE light because no data component is input. Accordingly, the R_IN_ALM signal can be used to determine whether the optical signal initially input includes the main signal component or includes only the ASE light.

In order for the input optical signal to reach the NB Mod 23, it is necessary to clear the shutdown of the pre-amplifiers 24 and 25. Accordingly, a timer is provided in the control unit 20. The shutdown of the pre-amplifiers 24 and 25 is cleared for a predetermined time period to cause the input optical signal to reach the NB Mod 23, allowing the control unit 20 to determine whether the data component is detected.

Since timeout occurs in the timer if no main signal component (data component) is detected, the control unit 20 shuts down the pre-amplifiers 24 and 25 at the occurrence of the timeout and adds an α dBm (for example, 3 dBm) to the initial input-of-light detection threshold value T0 to generate the correction threshold value Tc.

As described above, the control unit 20 repeats the comparison of the level of the ASE light with the initial input-of-light detection threshold value T0, the generation of the first correction threshold value Tc (if the level of the ASE light>the initial input-of-light detection threshold value T0), the comparison of the level of the ASE light with the first correction threshold value Tc, the generation of the second correction threshold value Tc (if the level of the ASE light>the first correction threshold value Tc), . . . , and so on until the correction threshold value Tc that is increased stepwise exceeds the level of the ASE light to set the correction threshold value Tc exceeding the level of the ASE light as the loss-of-light detection threshold value Th.

Figure 7:
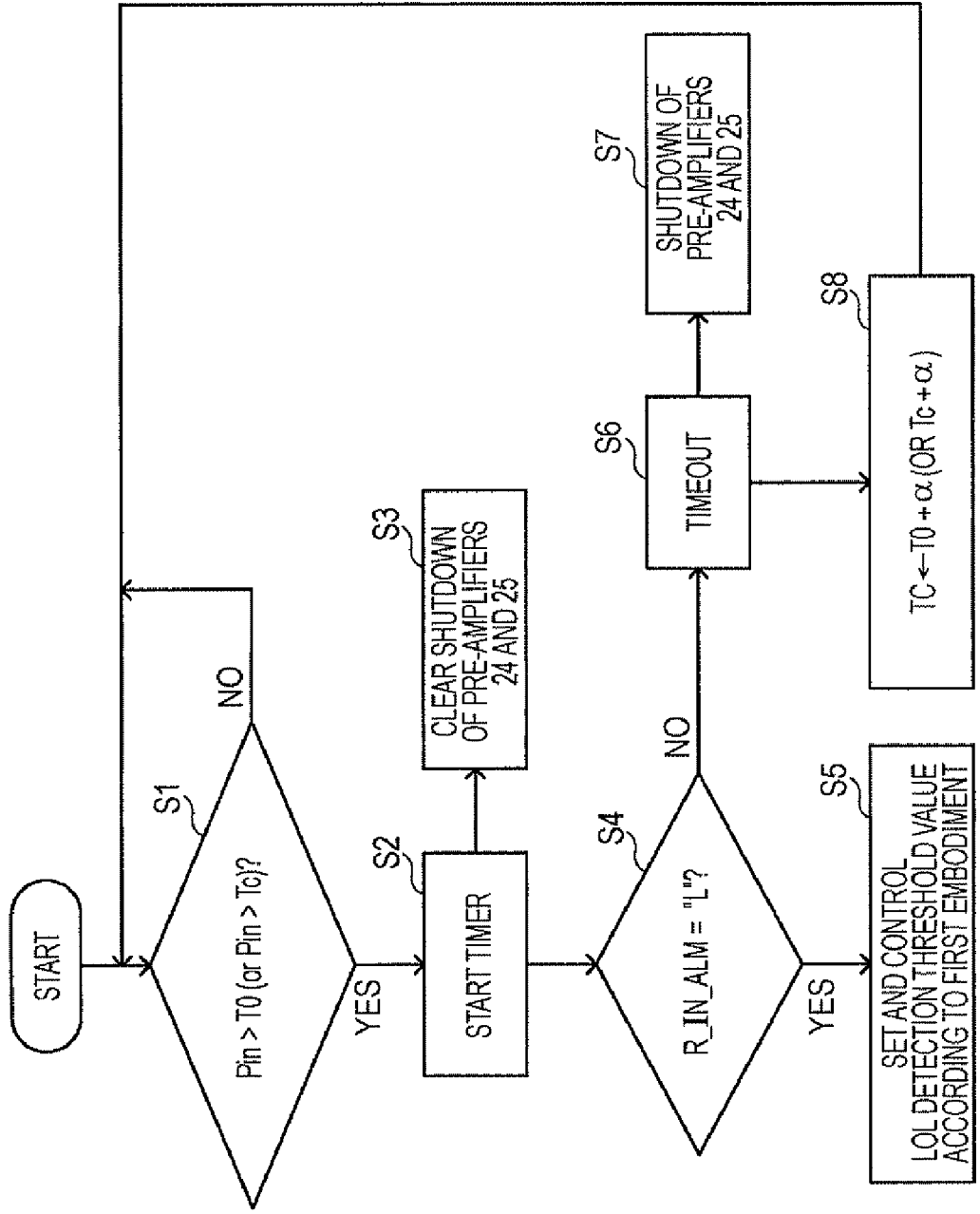
FIG. 7 is a flowchart showing an example of a process of setting a loss-of-light detection threshold value.

FIG. 7 is a flowchart showing an example of a process of setting the loss-of-light detection threshold value Th.

In Step S1, the control unit 20 compares the level $P_{IN}$ of an optical signal input in the transponder device 2 with the initial input-of-light detection threshold value T0. If $P_{IN}$>T0, the process goes to Step S2. If $P_{IN}$≦T0, the control unit 20 repeats the comparison in Step S1.

In Step S2, the control unit 20 starts the timer.

In Step S3, the control unit 20 clears the shutdown of the pre-amplifiers 24 and 25.

In Step S4, the control unit 20 determines the value of the R_IN_ALM signal output from the NB Mod 23. If the R_IN_ALM signal is set to "L" (if the main signal component is included in the input optical signal), the process goes to Step S5. If the R_IN_ALM signal is set to "H" (if no main signal component is included in the input optical signal and only the ASE light is included therein), the process goes to Step S6.

In Step S5, the control unit 20 performs the setting and control of the loss of light detection threshold value according to the first embodiment.

In Step S6, the timer in the control unit 20 causes timeout.

In Step S7, the control unit 20 shuts down the pre-amplifiers 24 and 25.

In Step S8, the control unit 20 increments the initial input-of-light detection threshold value T0 by α dBm (3 dBm) to generate the correction threshold value Tc. Then, the process goes back to Step S1. In Step S1, the control unit 20 replaces the initial input-of-light detection threshold value T0 with the correction threshold value Tc to repeat the subsequent steps by using the correction threshold value Tc.

As described above, according to the second embodiment, the control unit 20 generates the correction threshold value Tc that is increased stepwise to a level exceeding the level of the ASE light, sets the correction threshold value Tc higher than the level of the ASE light as the loss-of-light detection threshold value Th, and performs the detection of any loss of light on the basis of the set loss-of-light detection threshold value Th. Accordingly, even if the input optical signal includes only the ASE light, it is possible to reliably detect any loss of light.

An exemplary configuration and operation of the transponder device 2 will now be described in detail.

Figure 8:
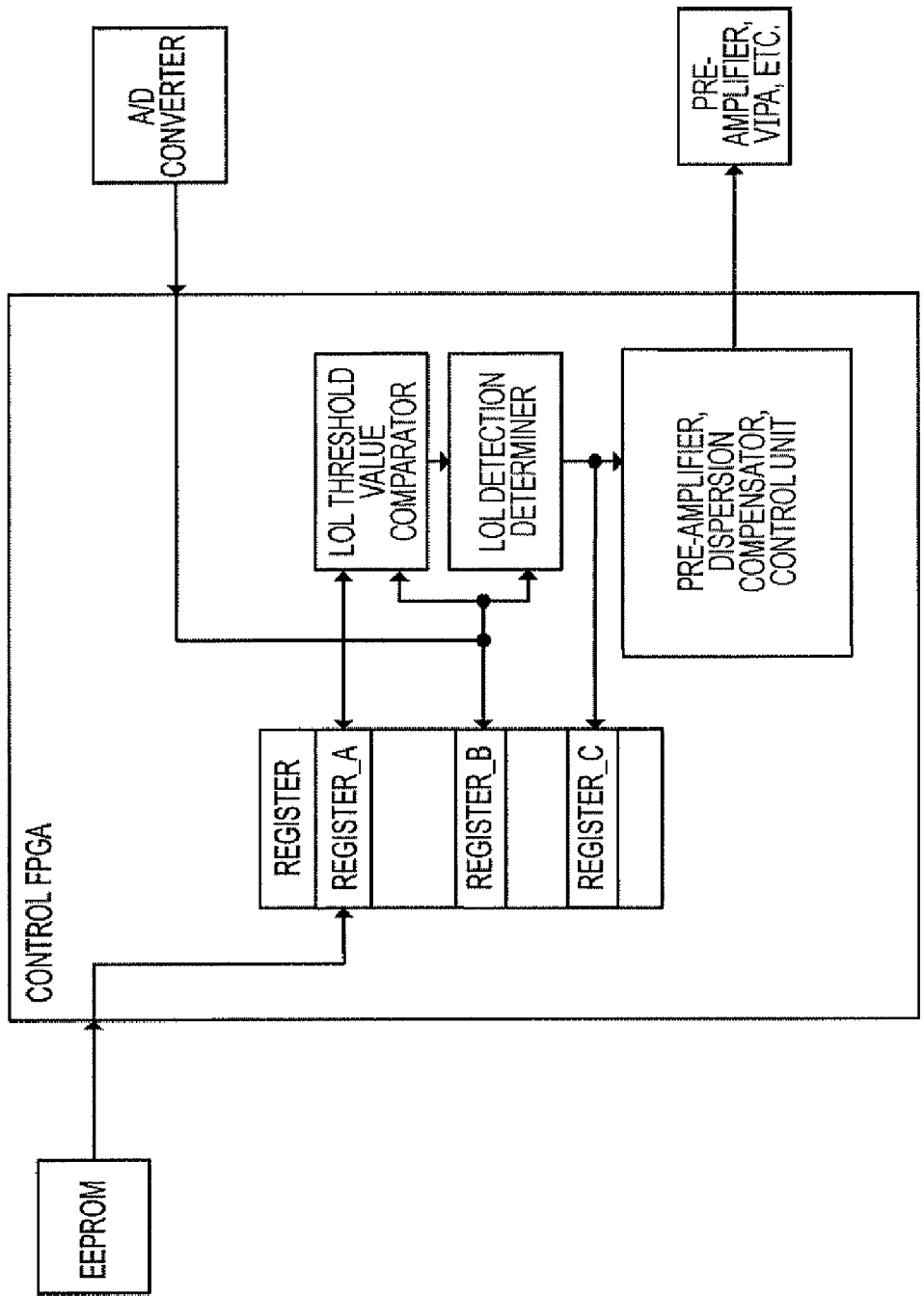
FIG. 8 is a block diagram showing an example of the configuration of a control.

FIG. 8 is a block diagram showing an example of the configuration of the control unit 20 in the transponder device 2. Part of the functional blocks in the control unit 20 is shown in FIG. 8. The control unit 20 is represented as a control field programmable gate array (FPGA) in FIG. 8. An LOL ALM detection threshold value is stored in an external non-volatile memory (such as an electronically erasable and programmable read only memory (EEPROM)). An LOL ALM denotes an alarm activated when the LOL occurs. When the control FPGA is recovered from the reset state, the LOL ALM detection threshold value is read from the EEPROM and the read LOL ALM detection threshold value is stored in an internal register (register_A). The input light power is subjected to digital conversion in the A/D converter and is stored in a register_B, an LOL threshold value comparator, and an LOL detection determiner in the control FPGA. The LOL threshold value comparator determines the loss-of-light detection threshold value on the basis of the LOL ALM detection threshold value in the register_A and the input light power and indicates the determined loss-of-light detection threshold value to the LOL detection determiner. The LOL detection determiner compares the loss-of-light detection threshold value with the input light power. If the LOL ALM is detected, the LOL detection determiner indicates the detected LOL ALM to the pre-amplifiers, the dispersion compensator, and the control unit and writes "1" in an LOL detection bit in a register_C to set an LOL detection flag.

Figure 9:
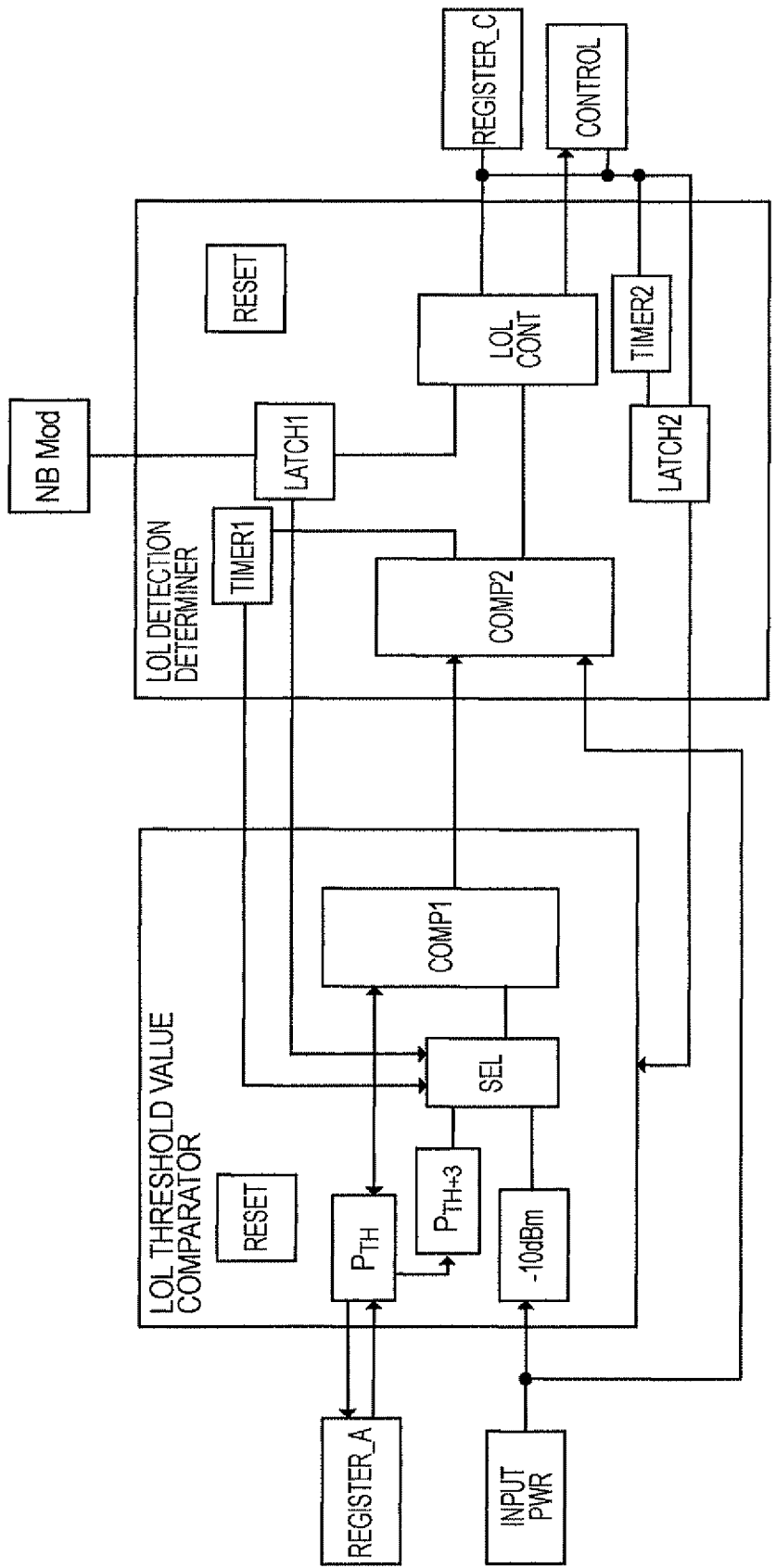
FIG. 9 is a block diagram showing an example of the configuration of an LOL threshold value comparator and an LOL detection determiner in a control FPGA.

FIG. 9 is a block diagram showing an example of the configuration of the LOL threshold value comparator and the LOL detection determiner. The LOL threshold value comparator includes a functional part $P_{TH}$, a functional part −10 dBm, a functional part $P_{TH+3}$, a selector SEL, and a functional part COMP1. The functional part ($P_{TH}$) reads information concerning the loss-of-light threshold value from the register_A and writes the loss-of-light detection threshold value determined by the input light power in the register_A. The functional part −10 dBm calculates the level by subtracting 10 dBm from the input light power. The functional part $P_{TH+3}$ calculates the level by adding 3 dBm to the value of the functional part $P_{TH}$. The selector SEL switches between no comparison of the loss-of-light threshold value (no output from the selector SEL), the selection of the value of the functional part $P_{TH+3}$ as the loss-of-light threshold value, and the selection of the value of the functional part −10 dBm as the loss-of-light threshold value. The functional part COMP1 compares the value of the functional part $P_{TH}$ with the value of the functional part $P_{TH+3}$ or the value of the functional part −10 dBm to select the higher level of light and indicates the selected level of light to the LOL detection determiner.

The LOL detection determiner includes a functional part COMP2, a timer TIMER1, a timer TIMER2, a latch LATCH1, a latch LATCH2, and a functional part LOL CONT. The functional part COMP2 compares the information concerning the loss-of-light threshold value supplied from the LOL threshold value comparator with the input light power. The timer TIMER1 starts if the input light power becomes higher than the value of the functional part $P_{TH}$. The timer TIMER2 starts when the LOL ALM is cleared. The latch LATCH1 latches the "L" state of the R_IN_ALM signal of the NB Mod 23. The latch LATCH2 latches the clear of the LOL ALM. The functional part LOL CONT declares the LOL ALM on the basis of the information in the latch LATCH1 and the functional part COMP2 and transmits signals used for controlling the preamplifiers and the dispersion compensator so as to detect any loss of light. Since the NB Mod 23 is provided downstream of the pre-amplifiers and the dispersion compensator, it is necessary to operate the pre-amplifiers and the dispersion compensator in order to use the R_IN_ALM signal.

Figure 10:
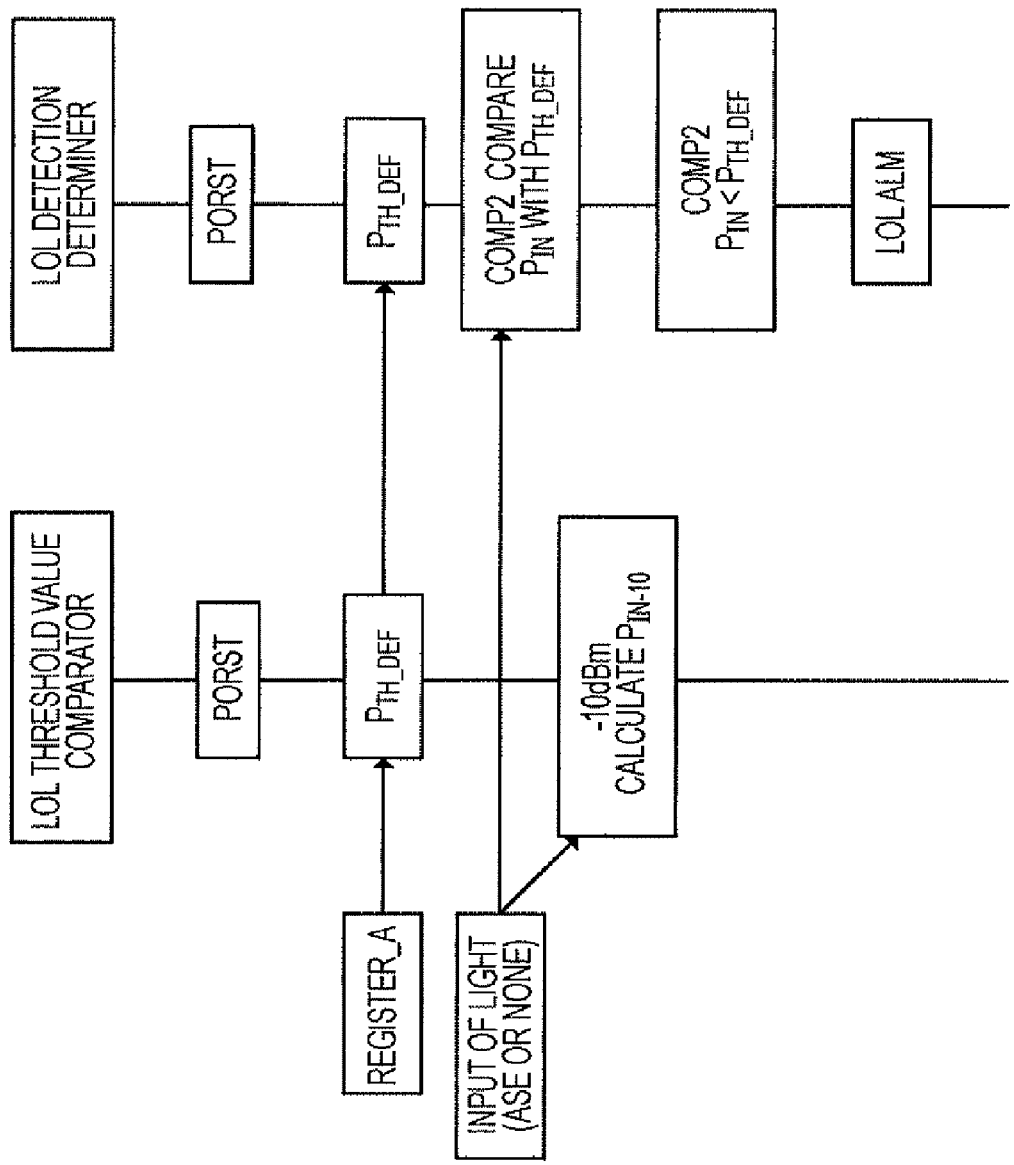
FIG. 10 illustrates an example of a process flow when a Power on reset (PORST) signal has a level lower than $P_{TH\_DEF}$ or when no optical signal is supplied therefrom.

FIG. 10 illustrates an example of a process flow when a Power on reset (PORST) signal has a level lower than the default of the $P_{TH}$ ($P_{TH\_DEF}$) or when no optical signal is supplied. After clearing the PORST, the $P_{TH\_DEF}$ is read from the register_A into the LOL threshold value comparator. The SEL in the LOL threshold value comparator stops the output of data and the $P_{TH\_DEF}$ is indicated to the LOL detection determiner. The LOL detection determiner compares the level $P_{IN}$ of the input optical signal with the $P_{TH\_DEF}$ and declares the LOL ALM because $P_{IN} < P_{TH\_DEF}$.

Figure 11:
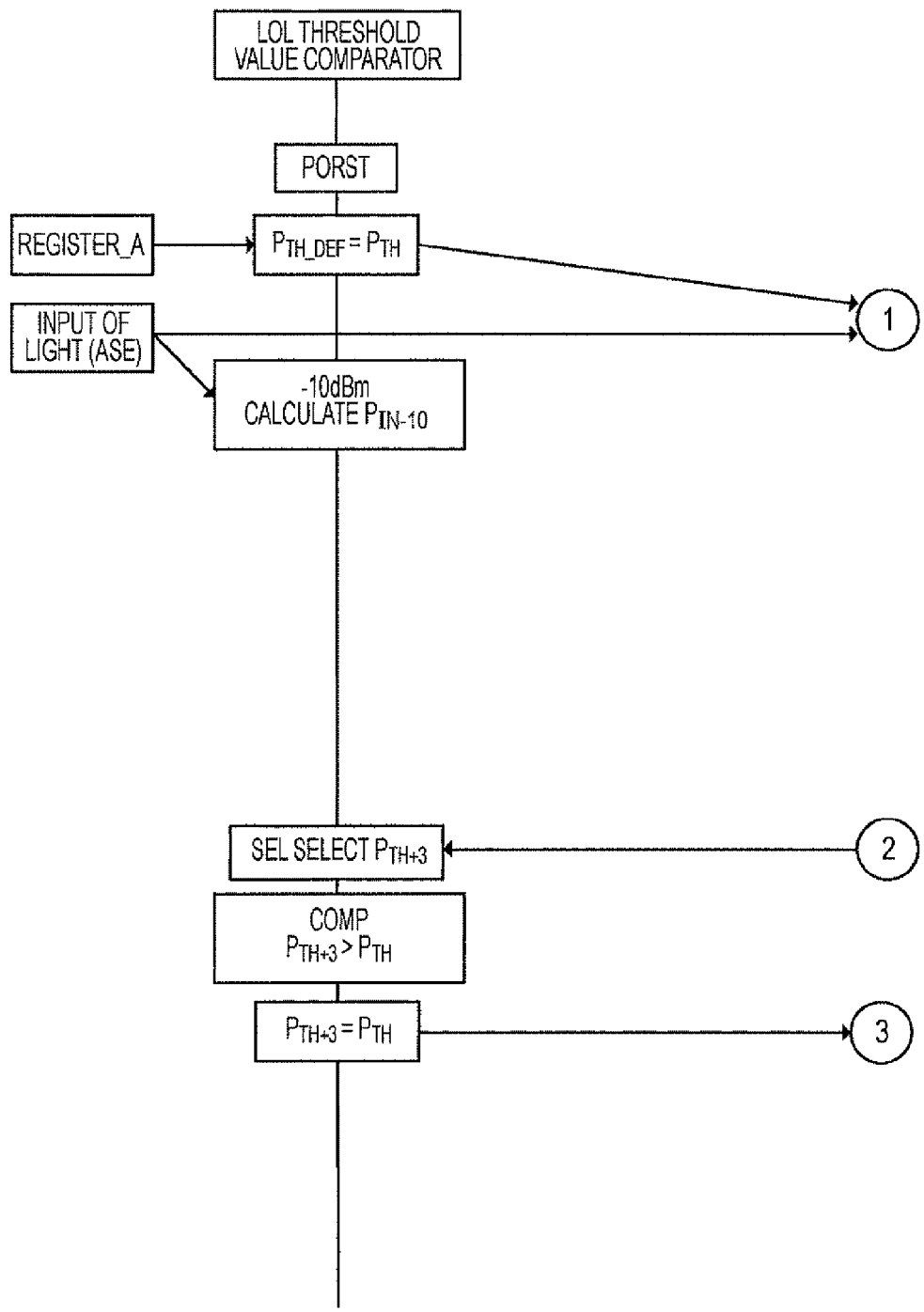
FIG. 11 illustrates an example of a process flow when the ASE light of a level higher than the $P_{TH\_DEF}$ is received through the PORST.
Figure 12:
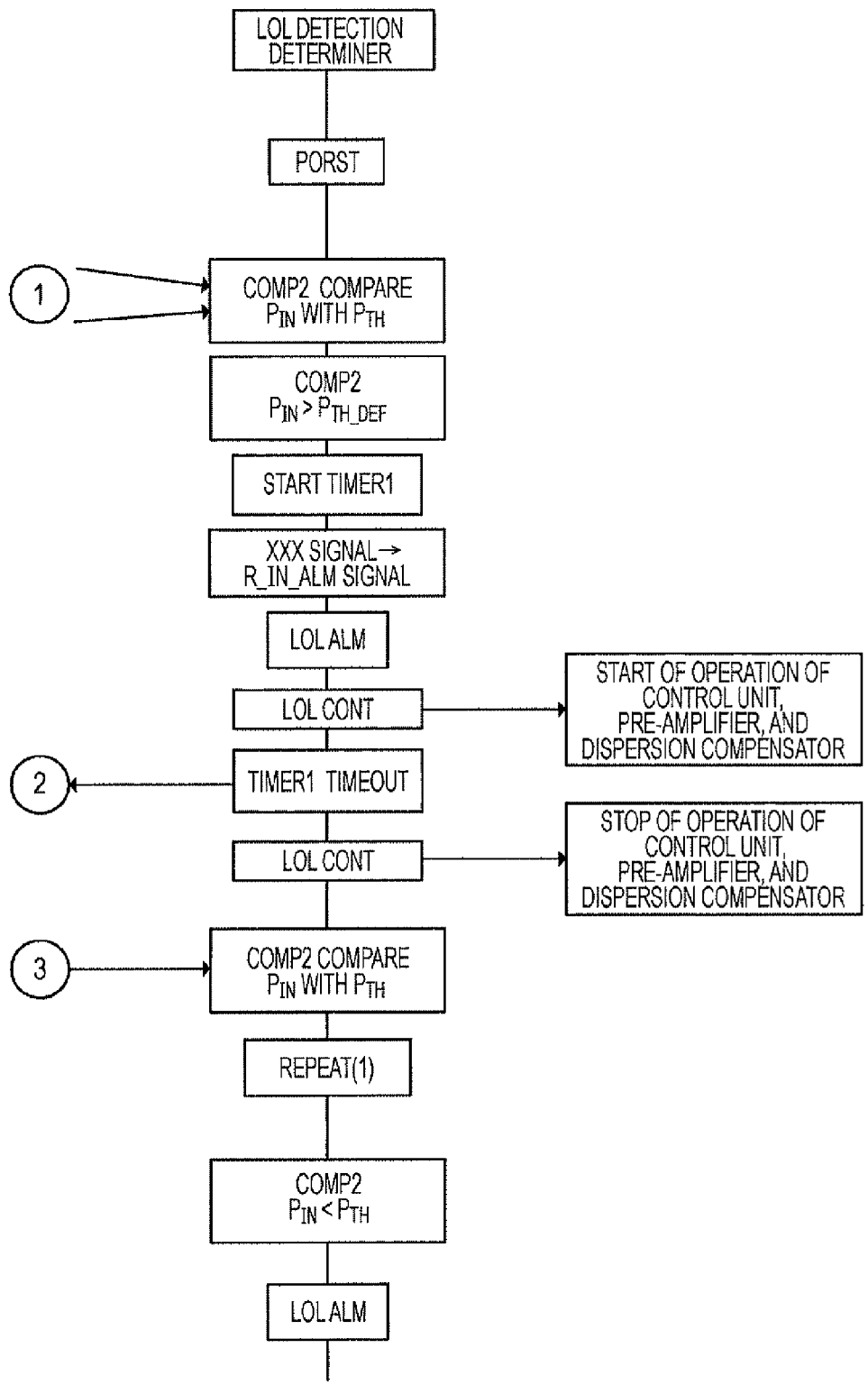
FIG. 12 illustrates the example of the process flow when the ASE light of the level higher than the $P_{TH\_DEF}$ is received through the PORST.

FIGS. 11 and 12 illustrate an example of a process flow when the ASE light of a level higher than the $P_{TH\_DEF}$ is received through the PORST. If $P_{IN} > P_{TH\_DEF}$, the functional part COMP2 in the LOL detection determiner enters the normal state in which an optical signal is received to start the timer TIMER1 in the LOL detection determiner. The functional part LOL CONT supplies control start signals used for controlling the pre-amplifiers and the dispersion compensator to the control unit. The control unit starts the clear of the shutdown of the pre-amplifiers and the adjustment of the dispersion compensator.

The control start signals are transmitted only if the R_IN_ALM signal is set to "H" and the output from the functional part COMP2 is in the normal state. The R_IN_ALM signal is kept to "H" even when the pre-amplifiers and the dispersion compensator start to operate because the ASE light is received. Accordingly, the functional part LOL CONT continues to declare the LOL ALM to the register_C. The timer TIMER1 causes timeout after a predetermined time.

The timeout is indicated to the SEL in the LOL threshold value comparator. Concurrently, the functional part LOL CONT instructs the control unit to shut down the pre-amplifiers and to stop the adjustment of the dispersion compensator. The selector SEL in the LOL threshold value comparator selects the value of the functional part $P_{TH+3}$ and indicates the selection of the value of the functional part $P_{TH+3}$ to the functional part COMP1. The functional part COMP1 indicates the value of the functional part $P_{TH+3}$ as the loss-of-light detection threshold value to the LOL detection determiner because the value of the functional part $P_{TH+3}$ is higher than the value of the functional part $P_{TH}$ by 3 dBm. The functional part COMP2 in the LOL detection determiner compares the level $P_{IN}$ of the input optical signal with the loss-of-light detection threshold value.

The value of the functional part $P_{TH+3}$ is written as the loss-of-light detection threshold value in the functional part $P_{TH}$ in the LOL threshold value comparator. The above steps are repeated until the value of the functional part $P_{TH}$ becomes higher than the level $P_{IN}$ of the input optical signal or an optical signal is received. The time before the timeout occurs in the timer TIMER1 is determined on the basis of the longest time before the CDR circuit in the NB Mod 23 can normally detect data from the PORST.

Since Differential Quadrature Phase Shift Keying (DQPSK) modulation is adopted in the second embodiment, the NB Mod 23 includes a coding interferometer. Accordingly, the longest time before the CDR circuit in the NB Mod 23 can normally detect data is around 120 seconds.

Figure 13:
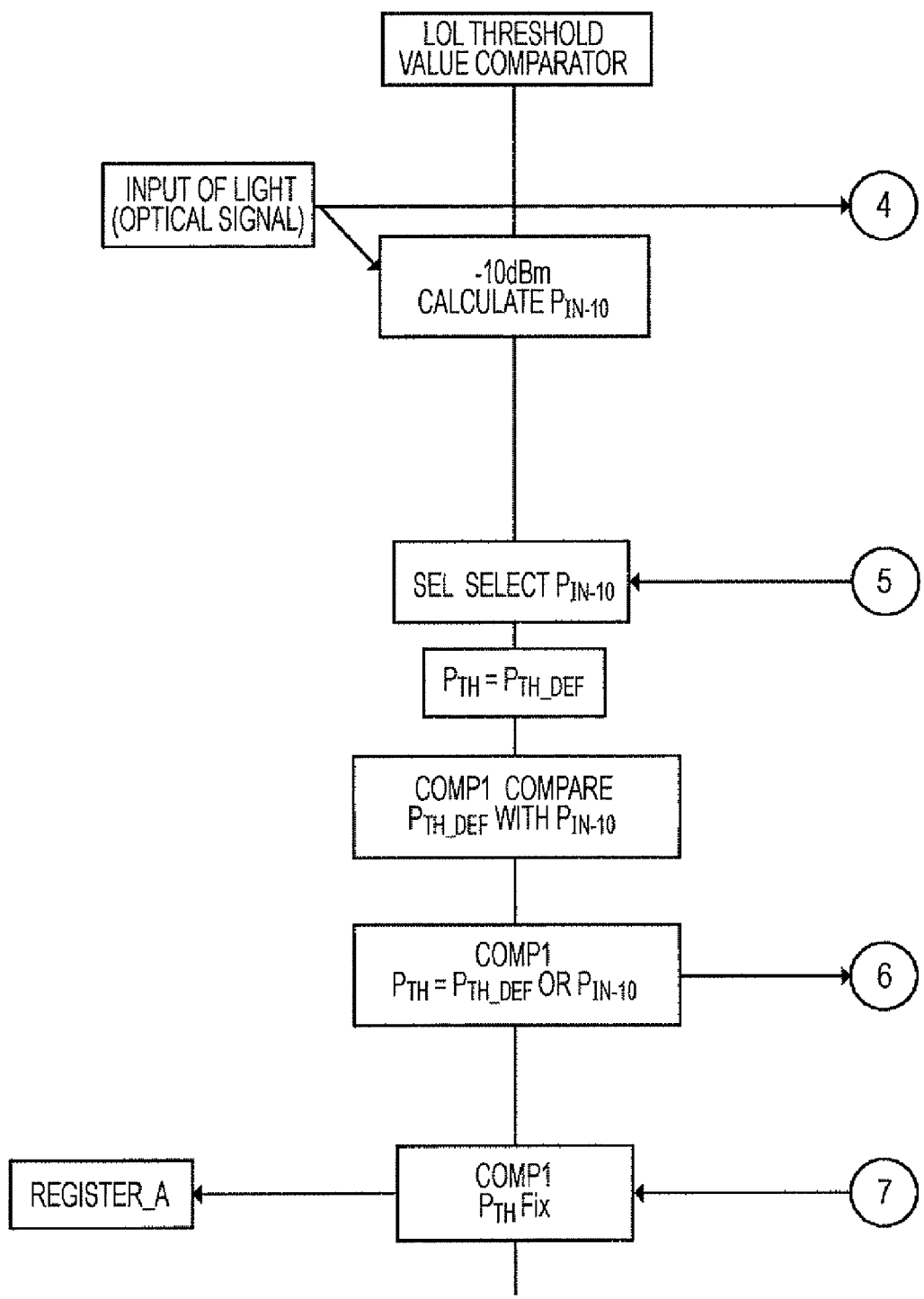
FIG. 13 illustrates an example of a process flow when an optical signal is received.
Figure 14:
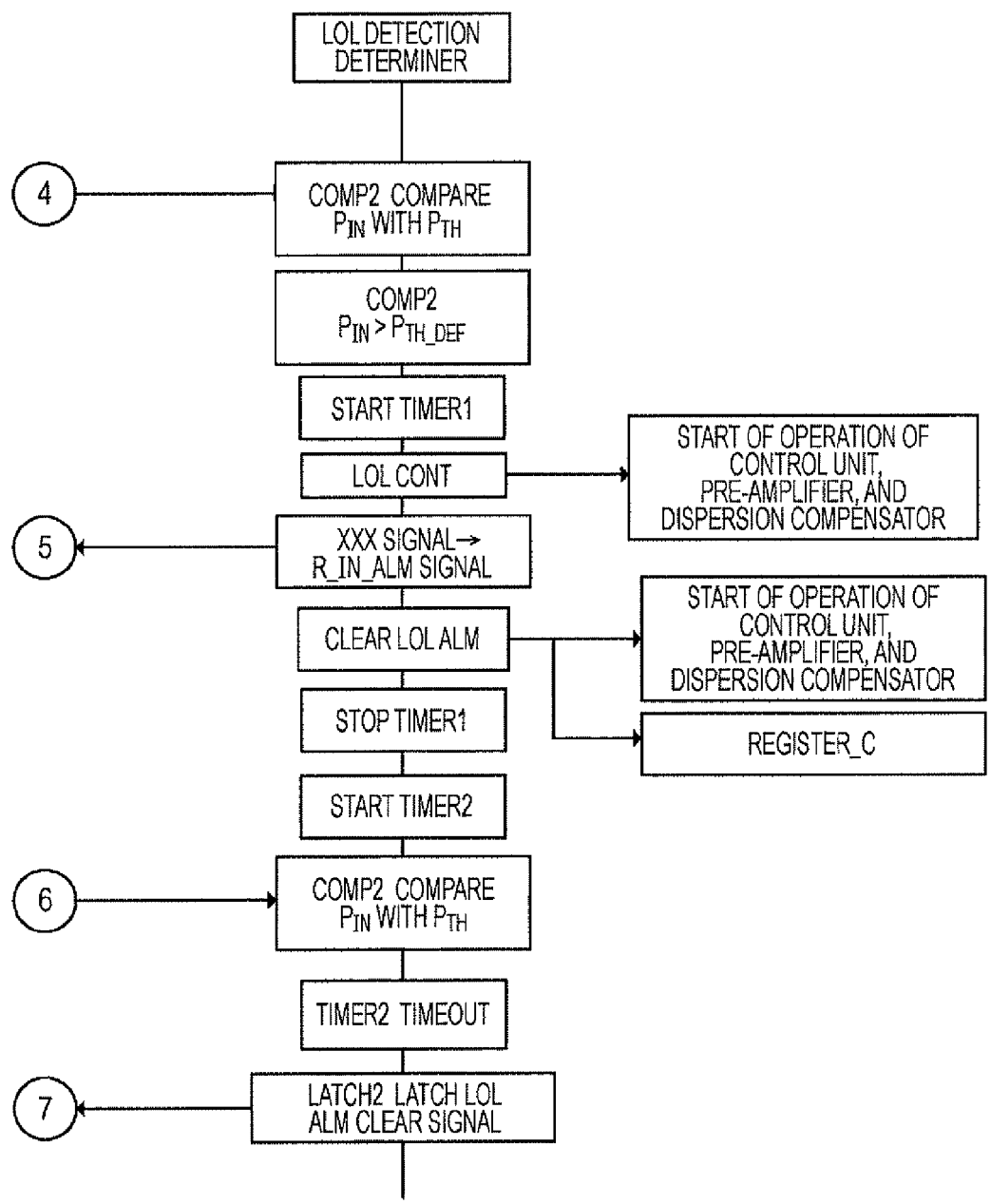
FIG. 14 illustrates the example of the process flow when the optical signal is received.

FIGS. 13 and 14 illustrate an example of a process flow when an optical signal is received. When an optical signal is received, the functional part −10 dBm in the LOL threshold value comparator calculates $P_{IN\text{-}10}$. Concurrently, the functional part COMP2 in the LOL detection determiner compares the level $P_{IN}$ of the input optical signal with the value of the functional part $P_{TH}$. If an optical signal is normally received, the timer TIMER1 starts to operate because $P_{IN} > P_{TH\_DEF}$.

The R_IN_ALM signal supplied from the NB Mod 23 is set to "L" and the "L" state of the R_IN_ALM signal is latched in the latch LATCH1. Since the functional part COMP2 and the R_IN_ALM signal are also in the normal state, the LOL ALM is cleared. After the LOL ALM is cleared, the LOL detection determiner stops the timer TIMER1 and starts the timer TIMER2.

The clear of the LOL ALM is also indicated to the pre-amplifiers and the dispersion compensator outside the LOL detection determiner. The signal latched in the latch LATCH1 is indicated to the LOL threshold value comparator. The selector SEL in the LOL threshold value comparator selects the $P_{IN\text{-}10}$ as the threshold value that is to be compared and that is indicated to the functional part COMP1. In this case, the $P_{TH\_DEF}$ is read from the register_A and the $P_{TH}$ is set to the $P_{TH\_DEF}$. The functional part COMP1 compares the $P_{TH\_DEF}$ with the $P_{IN\text{-}10}$ and indicates the loss-of-light detection threshold value to the LOL detection determiner. The timer TIMER2 started at the clear of the LOL ALM causes timeout after a predetermined time, like the timer TIMER1. At the occurrence of the timeout, the latch LATCH2 latches the signal in the state in which the LOL ALM is cleared.

The latched LOL ALM clear signal is indicated to the LOL threshold value comparator and the operation of the functional part COMP1 is stopped in order to prevent the loss-of-light threshold value from varying due to a decrease in the output from a transponder on the transmission path or at the opposite side. The functional part COMP1 holds the value when the latched LOL ALM clear signal is received and writes the loss-of-light detection threshold value in the register_A.

Figure 15:
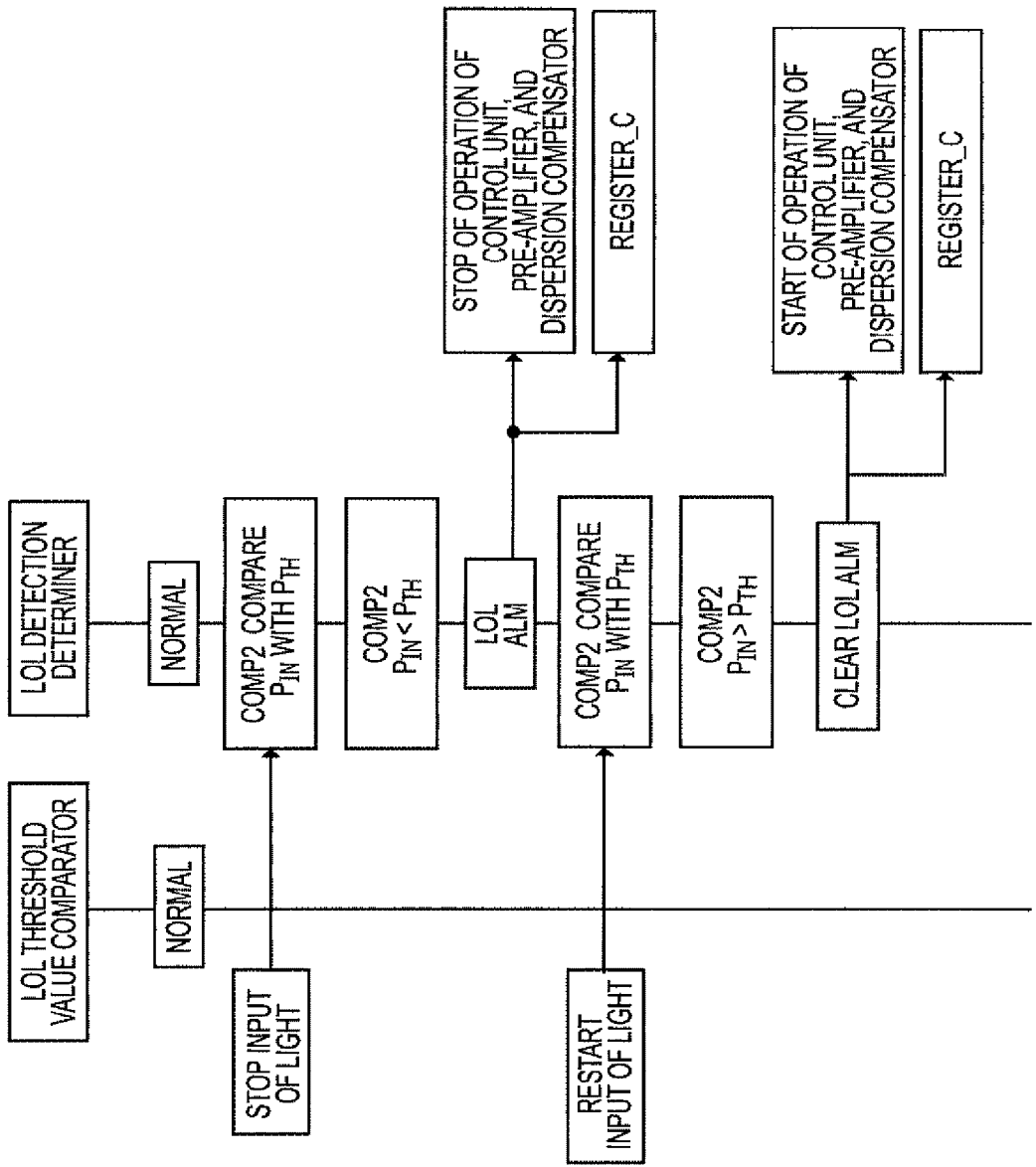
FIG. 15 illustrates an example of a process flow when the detection of any loss of light is recovered.

FIG. 15 illustrates an example of a process flow when the detection of any loss of light is recovered. If no optical signal is supplied to the transponder, $P_{IN} < P_{TH}$ in the functional part COMP2 in the LOL detection determiner. The functional part LOL CONT in the LOL detection determiner declares the LOL ALM in the register_C. The control unit stops the operation of the pre-amplifiers and the dispersion compensator. Since the latch LATCH1 latches the "L" state of the R_IN_ALM signal although the R_IN_ALM signal is set to "H" because no optical signal is supplied to the transponder, the control with the R_IN_ALM signal is not performed.

In addition, since the signal latched in the latch LATCH2 is also held, the value held in the functional part COMP1 in the LOL threshold value comparator is not varied at the detection of any loss of light. If $P_{IN} > P_{TH}$ in the functional part COMP2 when the input of light is recovered, the functional part LOL CONT indicates the clear of the LOL ALM to the register_C. The control unit 20 starts the clear of the shutdown of the pre-amplifiers and the adjustment of the dispersion compensation value in the dispersion compensator.

The LOL threshold value comparator and the LOL detection determiner each include a functional part that can be externally initialized. The initialization function is manually performed if the distribution of the ASE light is greatly changed because of the switching of the transmission path to vary the power of light input in the transponder.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An apparatus comprising:
a correction level calculator that calculates a correction level, which is an input signal light level necessary to meet an optical signal-to-noise ratio at a maximum level of an optical noise;
a threshold-value setting unit that compares the correction level with an initial threshold value to set a loss-of-light detection threshold value used in detection of loss of signal light based on the comparison result; and
a loss-of-light detector that compares a level of an input optical signal with the loss-of-light detection threshold value to determine that loss of signal light is caused when the level of the input optical signal is lower than the loss-of-light detection threshold value,
wherein the threshold-value setting unit sets the correction level as the loss-of-light detection threshold value when the correction level is higher than the initial threshold value and sets the initial threshold value as the loss-of-light detection threshold value if the correction level is lower than the initial threshold value.

2. The loss-of-light detecting apparatus according to claim 1,
wherein the threshold-value setting unit sets the loss-of-light detection threshold value for each wavelength channel, and the loss-of-light detector uses the loss-of-light detection threshold value set in the threshold-value setting unit to detect loss of signal light on each wavelength channel.

3. The loss-of-light detecting apparatus according to claim 1,
wherein the correction level calculator calculates the optical signal-to-noise ratio according to the following equation:

$$OSNR = 10 \times \log 10(P_{sig}/P_{ASE})$$

where "$P_{sig}$" denotes the power of the optical signal and "$P_{ASE}$" denotes the power of the optical noise, and represents a relationship according to the following equation:

$$ASE2 = 10 \times \log 10(B2/B1) + ASE1$$

where "B1" denotes the bandwidth of the optical noise set according to the optical signal-to-noise ratio, "B2" denotes the bandwidth of the optical noise actually input in the apparatus, "ASE1" denotes the value in decibels of the optical noise within the bandwidth B1, and "ASE2" denotes the value in decibels of the optical noise within the bandwidth B2, and
wherein the loss-of-light detecting apparatus calculates the minimum value of the power $P_{sig}$ of the optical signal meeting the optical signal-to-noise ratio when the loss-of-light detecting apparatus receives the optical noise of the maximum level and calculates an approximate minimum value of the difference between the maximum level of the optical noise and the minimum level of the optical signal based on the above equations to set a value given by subtracting the approximate minimum value from the level of the input optical signal as the correction level.

4. A loss-of-light detecting apparatus comprising:
an input-of-light detector that detects input of an optical signal;
a main signal component determining unit that determines whether a main signal component is included in the input optical signal;
a correction threshold value generating unit that generates a correction threshold value by adding a predetermined value to a threshold value used in the detection of input of an optical signal to increase the threshold value if the input optical signal does not include the main signal component and includes only an optical noise;
a threshold-value setting unit that sets a loss-of-light detection threshold value used in the detection of loss of signal light based on the level of the optical noise and the correction threshold value; and
a loss-of-light detector that compares the level of the input optical signal with the loss-of-light detection threshold value and determines that the loss of signal light is caused if the level of the input optical signal is lower than the loss-of-light detection threshold value,
wherein the correction threshold value generating unit repeats increase of the threshold value until the level of the optical noise becomes lower than the correction threshold value, and
wherein the threshold-value setting unit sets the correction threshold value exceeding the level of the optical noise as the loss-of-light detection threshold value.

5. The loss-of-light detecting apparatus according to claim 4,
wherein the threshold-value setting unit sets the loss-of-light detection threshold value for each wavelength channel, and the loss-of-light detector uses the loss-of-light detection threshold value set in the threshold-value setting unit to detect loss of signal light on each wavelength channel.

6. A loss-of-light detecting apparatus comprising:
a first controlling unit; and
a second controlling unit,
wherein the first controlling unit includes
an input-of-light detecting part that detects input of an optical signal;
a main signal component determining part that determines whether a main signal component is included in the input optical signal;
a correction threshold value generating part that generates a correction threshold value by adding a predetermined value to a threshold value used in the detection of input of an optical signal to increase the threshold value if the input optical signal does not include the main signal component and includes only an optical noise;
a first threshold-value setting part that sets a first loss-of-light detection threshold value used in the detection of loss of signal light based on the level of the optical noise and the correction threshold value; and
a first loss-of-light detecting part that compares the level of the input optical signal with the first loss-of-light detection threshold value and determines that the loss of signal light is caused if the level of the input optical signal is lower than the first loss-of-light detection threshold value,
wherein the second controlling unit includes
a correction level calculating part that calculates a correction level necessary to meet an optical signal-to-noise ratio at the maximum level of the optical noise;
a second threshold-value setting part that compares the correction level with an initial threshold value to set a second loss-of-light detection threshold value used in detection of loss of signal light based on the comparison result; and
a second loss-of-light detecting part that compares the level of the input optical signal with the second loss-of-light detection threshold value to determine that loss of signal light is caused if the level of the input optical signal is lower than the second loss-of-light detection threshold value,
wherein, if the optical signal input at system startup does include the main signal component and includes only the optical noise, the correction threshold value generating part repeats increase of the threshold value until the level of the optical noise becomes lower than the correction threshold value and the first threshold-value setting part sets the correction threshold value exceeding the level of the optical noise as the first loss-of-light detection threshold value, and
wherein, if the optical signal input at system startup includes the main signal component, the second threshold-value setting part sets the correction level as the second loss-of-light detection threshold value if the correction level is higher than the initial threshold value and sets the initial threshold value as the second loss-of-light detection threshold value if the correction level is lower than the initial threshold value.

7. The loss-of-light detecting apparatus according to claim 6,
wherein the correction level calculating part calculates the optical signal-to-noise ratio according to the following equation:

$$OSNR = 10 \times \log 10(P_{sig}/P_{ASE})$$

where "$P_{sig}$" denotes the power of the optical signal and "$P_{ASE}$" denotes the power of the optical noise, and represents a relationship according to the following equation:

$$ASE2 = 10 \times \log 10(B2/B1) + ASE1$$

where "B1" denotes the bandwidth of the optical noise set according to the optical signal-to-noise ratio, "B2" denotes the bandwidth of the optical noise actually input in the apparatus, "ASE1" denotes the value in decibels of the optical noise within the bandwidth B1, and "ASE2" denotes the value in decibels of the optical noise within the bandwidth B2, and
wherein the loss-of-light detecting apparatus calculates the minimum value of the power $P_{sig}$ of the optical signal meeting the optical signal-to-noise ratio when the loss-of-light detecting apparatus receives the optical noise of the maximum level and calculates an approximate minimum value of the difference between the maximum level of the optical noise and the minimum level of the optical signal based on the above equations to set a value given by subtracting the approximate minimum value from the level of the input optical signal as the correction level.

8. A loss-of-light detecting apparatus comprising:
a calculator that calculates a correction level, which is a level of an input optical signal light necessary to meet an optical signal-to-noise ratio at a maximum level of an optical noise;
a threshold-value setter that compares the correction level with an initial threshold value to set a threshold value for a loss-of-light detection used in detection of loss of light based on the comparison result;
a loss-of-light detector that compares an input light level of the input optical signal light with the threshold value for the loss-of-light detection to determine that the loss of light is caused if the input light level of the input optical signal light is lower than the loss-of-light detection threshold value,
wherein the threshold-value setter sets the correction level as the loss-of-light detection threshold value when the correction level is higher than the initial threshold value and sets the initial threshold value as the loss-of-light detection threshold value when the correction level is lower than the initial threshold value.

* * * * *